(12) United States Patent
Hiura et al.

(10) Patent No.: US 7,586,705 B2
(45) Date of Patent: Sep. 8, 2009

(54) MAGNETIC RECORDING/REPRODUCING APPARATUS AND MAGNETIC RECORDING/REPRODUCING METHOD

(75) Inventors: Tomoyuki Hiura, Kanagawa (JP); Hiroyuki Ino, Tokyo (JP); Toshiyuki Nakagawa, Kanagawa (JP); Norihito Mihota, Saitama (JP); Tomohiro Ikegami, Kanagawa (JP); Shinichi Fukuda, Kanagawa (JP); Yoshihiko Deoka, Tokyo (JP); Hidetoshi Honda, Miyagi (JP); Masaaki Hara, Tokyo (JP)

(73) Assignee: Sony Corporation, Tokyo (JP)

( * ) Notice: Subject to any disclaimer, the term of this patent is extended or adjusted under 35 U.S.C. 154(b) by 341 days.

(21) Appl. No.: 11/728,305

(22) Filed: Mar. 23, 2007

(65) Prior Publication Data

US 2007/0242377 A1    Oct. 18, 2007

(30) Foreign Application Priority Data

Apr. 4, 2006    (JP) .............................. 2006-103065

(51) Int. Cl.
   *G11B 5/53*    (2006.01)
(52) U.S. Cl. ....................................... 360/39
(58) Field of Classification Search ........................ None
   See application file for complete search history.

(56) References Cited

U.S. PATENT DOCUMENTS 5,056,075 A * 10/1991 Maruta et al. ............ 369/44.29
5,404,248 A * 4/1995 Shimoda et al. ............... 360/48
5,757,742 A * 5/1998 Akiba et al. .............. 369/44.23
6,744,707 B1 * 6/2004 Sano et al. ................ 369/44.23

FOREIGN PATENT DOCUMENTS

| JP | 04-370580 | 12/1992 |
|---|---|---|
| JP | 05-20788 | 1/1993 |
| JP | 10-283620 | 10/1998 |
| JP | 2003-132504 | 5/2003 |
| JP | 2003-338012 | 11/2003 |
| JP | 2004-71014 | 3/2004 |

* cited by examiner

*Primary Examiner*—Mark Blouin
(74) *Attorney, Agent, or Firm*—Robert J. Depke; Rockey, Depke & Lyons, LLC

(57) ABSTRACT

A magnetic recording/reproducing apparatus is disclosed wherein reproduced signals read out from a plurality of recording tracks using a reproducing head can be separated into original recording signals of the recording tracks. Upon recording, an identification signal which has a recording wavelength equal to or greater than a minimum recording wavelength and causes no interference of any of the recording tracks with any adjacent one of the recording tracks is appended to and recorded together with a recording signal in order to allow, upon reproduction, acquisition of the position information of the reproducing head with respect to the plural recording tracks of the magnetic recording medium. Upon reproduction, a reproduced signal for each of the recording tracks of the magnetic recording medium is generated on the basis of the positional information read from the recording tracks.

18 Claims, 18 Drawing Sheets

MAGNETIC RECORDING/REPRODUCING APPARATUS AND MAGNETIC RECORDING/REPRODUCING METHOD

CROSS REFERENCES TO RELATED APPLICATIONS

The present invention contains subject matter related to Japanese Patent Application JP 2006-103065, filed in the Japan Patent Office on Apr. 4, 2006, the entire contents of which being incorporated herein by reference.

BACKGROUND OF THE INVENTION

1. Field of the Invention

The present invention relates to a magnetic recording/reproducing apparatus for recording data on a magnetic recording medium by making use of a recording head or a plurality of recording heads and reproducing signals from a plurality of tracks of the magnetic recording medium by making use of a reproducing head or a plurality of reproducing heads as well as relates to a magnetic recording/reproducing method adopted by the magnetic recording/reproducing apparatus.

2. Description of the Related Art

In recent years, it has been and is being demanded for a magnetic recording/reproducing apparatus to achieve higher density recording in order to increase the capacity of magnetic recording media, and it is demanded to narrow the track width of recording tracks (hereinafter referred to as "narrowing"). To narrowing of tracks, it is a key to improve the accuracy in tracking servo.

For the improvement of tracking servo, a non-tracking method has been proposed and put to practical use as disclosed, for example, in Japanese Patent No. 1,842,057, Japanese Patent No. 1,842,058, Japanese Patent No. 1,842,059, Japanese Patent Laid-open No. Hei 04-370580, and Japanese Patent Laid-open No. Hei 05-020788. In accordance with the non-tracking method, in a magnetic recording/reproducing apparatus, data are recorded separately in blocks for identification on tracks double azimuth recorded by helical scanning so that the data can be re-constructed even if an object track cannot be reproduced by one tracing operation. By the non-tracking system, a margin four times or more of that for position control of a reproducing head within one recording track required in conventional tracking servoing is permitted. In other words, it is permitted to reduce the accuracy in such position control to one fourth or less.

Further, the application of the non-tracking system to a magnetic tape recording/reproducing apparatus is not limited to helical scanning, but the possibility that the non-tracking system may be used in linear recording is studied as disclosed, for example, in Japanese Patent Laid-Open No. Hei 10-283620 or Japanese Patent Laid-Open No. 2003-132504.

However, where a nonmagnetic support member having stretchability such as, for example, a polyester film is used for a substrate of a tape as magnetic recording medium, even if double azimuth recording is performed, the permissible deformation amount is, for example, up to approximately twice the recording track width using tracking servoing together. If a greater amount of deformation occurs, then a signal cannot be reproduced with a sufficiently high S/N ratio. On the other hand, in recording which does not have double azimuths, the width of a guard band which does not extend across tracks must be suppressed to an amount smaller than the deformation amount of the tape in order that the reliability such as the error rate may not be deteriorated even where tracking servoing is used together.

Such problems as described above arise, in signal reproduction systems which have been implemented heretofore, from significant deterioration of the signal quality by reading in of a signal from a plurality of recording tracks at the same time by at least one reproducing head.

This similarly applies also to the non-tracking system. In particular, although a reproducing head apparently reproduces a signal across a plurality of tracks, where timing division is applied, the signal is reproduced normally from one recording track, but reproduction of a plurality of tracks at the same time is not performed.

If an effort to further increase the recording density is taken into consideration, reproduction of a signal from a single recording track at the same time provides a limit to narrowing of tracks.

As a background technique for a magnetic head apparatus, an apparatus is available wherein a plurality of heads are disposed in one block and a plurality of data frames are recorded at a time as a system for the formation in blocks of the same azimuth in order to enhance the recording density. One of such apparatus is disclosed, for example, In Japanese Patent Laid-open No. 2003-338012 or Japanese Patent Laid-open No. 2004-071014.

In the known apparatus, since the reproducing head width must be reduced to approximately one half the width of recording tracks, there is a restriction that a high output of a reproduction signal cannot be obtained. This gives rise to deterioration of the S/N ratio. Therefore, the apparatus are not necessarily suitable for further higher density recording.

In addition, narrowing of tracks provides a limitation at which the azimuth cannot be used any more.

SUMMARY OF THE INVENTION

As described above, in accordance with the traditional magnetic recording/reproducing systems, if it is desired to further increase the recording density, the width of the recording track must be reduced. However, if the width of the recording track is reduced in accordance with the traditional magnetic recording/reproducing techniques by keeping the techniques as they are, then this give rise to a problem that recording tracks cannot be traced by heads upon reproduction. Thus, in order to solve this problem, first of all, a non-tracking method has been proposed by which a reproducing head is capable of reading out a signal from a recording track even if the head is displaced from the track to a certain degree. However, in order to obtain a suitable signal by adoption of the non-tracking method, there is a restriction also to setting of the reproducing head. Therefore, where further narrowing of tracks is intended, it is difficult to construct a system which assures a high S/N ratio of the reproduction signal.

Addressing the problems described above, the inventors of the present invention have developed a technique which can reduce the restrictions to determination of the width of the reproducing head to achieve narrowing of the track width and high density recording.

However, in order to implement a magnetic recording/reproducing apparatus of the type described, a technique is demanded for separating reproduction signals read out from a plurality of recording tracks by reproducing heads into original recording signals each originating from one of the recording tracks.

In addition, since narrowing of tracks provides a limitation at which the azimuth cannot be used any more, it is difficult to use the conventional methods.

Therefore, it is demanded to provide a magnetic recording/reproducing apparatus and a magnetic recording/reproducing method which allow narrowing of the recording track width and higher density recording.

Also it is demanded to provide a magnetic recording/reproducing apparatus and a magnetic recording/reproducing method wherein reproduced signals read out from a plurality of recording tracks using a reproducing head can be separated into original recording signals while the reproducing head width does not rely upon narrowing of recording tracks.

Further, it is demanded to provide a magnetic recording/reproducing apparatus and a magnetic recording/reproducing method which assure precision in tracking servo equivalent to that achieved using double-azimuth recording.

According to the present invention, there is provided a magnetic recording/reproducing apparatus comprising a recording section configured to perform a signal process for recording a signal on a magnetic recording medium, a reproducing section including a reproducing head capable of reproducing a signal from a recording track of the magnetic recording medium and configured to reproduce signals from a plurality of ones of recording tracks of the magnetic recording medium by means of the reproducing head and acquire position information of the reproducing head with respect to the plural recording tracks and then generate a reproduced signal for each of the recording tracks of the magnetic recording medium on the basis of the positional information, and an identification signal appending section provided in the recording section and configured to append an identification signal which has a recording wavelength equal to or greater than a minimum recording wavelength and causes no interference with any adjacent one of the recording tracks to a recording signal in order to allow the reproducing section to acquire the information of the reproducing head with respect to the plural recording tracks of the magnetic recording medium.

The identification signal may include signals which are orthogonal on the time axis. As an alternative, the identification signal may include signals which are orthogonal on the frequency axis. As another alternative, the identification signal may include an orthogonal code.

Where the identification signal includes signals which are orthogonal on the time axis, the identification signal may be recorded on each recording track in such a manner as not to overlap with the identification signal on any adjacent recording track in the moving direction of the magnetic recording medium.

The identification signal may be recorded at a position preceding to a data region and also inside the data region such that the position information of the reproducing head with respect to the plural recording tracks is re-calculated midway of the data region. This can raise the traceability of the reproducing head with respect to the recording tracks against variation of the positional relationship between the reproducing head and the recording tracks caused by deformation of the recording medium or the like.

In this instance, a learning signal for automatic gain control and/or bit synchronism detection may be placed at a position preceding to the identification signal. Or, the identification signal may be placed at a position following a synchronizing signal used for detection of the start position of the identification signal.

Data may be recorded in a plurality of groups each including a plurality of recording tracks on the magnetic recording medium such that a guard region in which recording of data is inhibited is disposed between adjacent ones of the groups. This can prevent interference between recording tracks of adjacent groups.

With the magnetic recording/reproducing apparatus, narrowing of the recording track width and higher density recording can be anticipated. Further, reproduced signals read out from a plurality of recording tracks using a reproducing head can be separated into original recording signals of the recording tracks while the reproducing head width does not rely upon narrowing of recording tracks.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

First Embodiment

Figure 1:
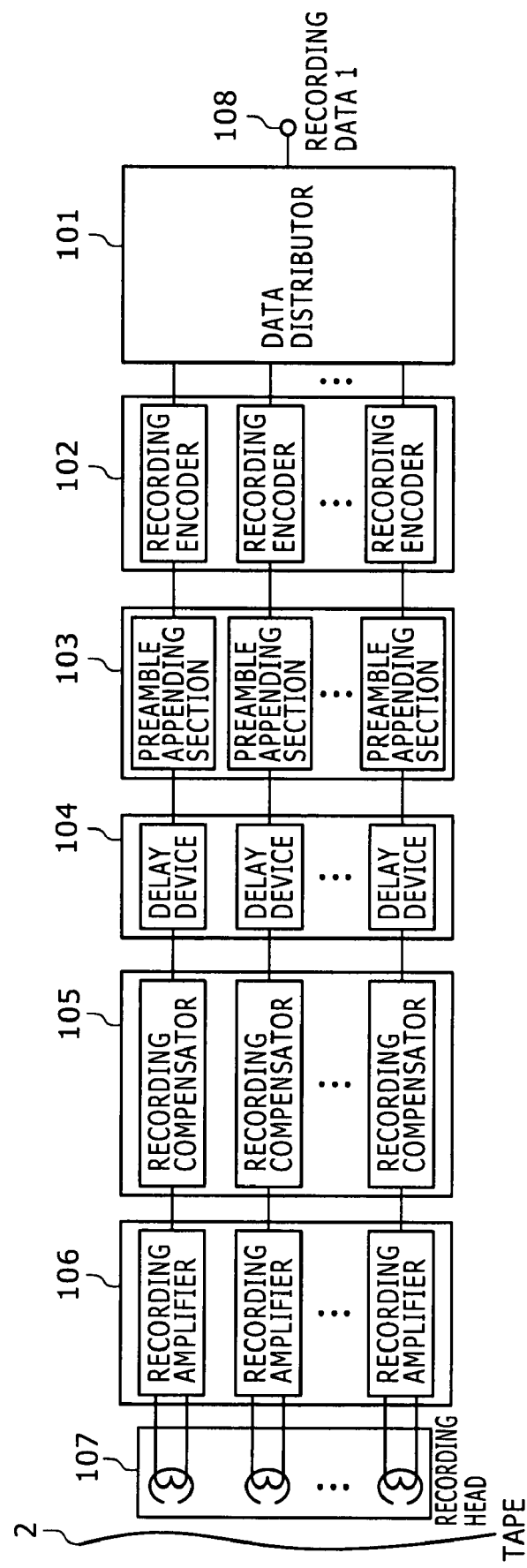
FIG. 1 is a block diagram showing the configuration of a recording unit of a magnetic recording/reproducing apparatus according to a first embodiment of the present invention which makes use of multi-head arrays.
Figure 2:
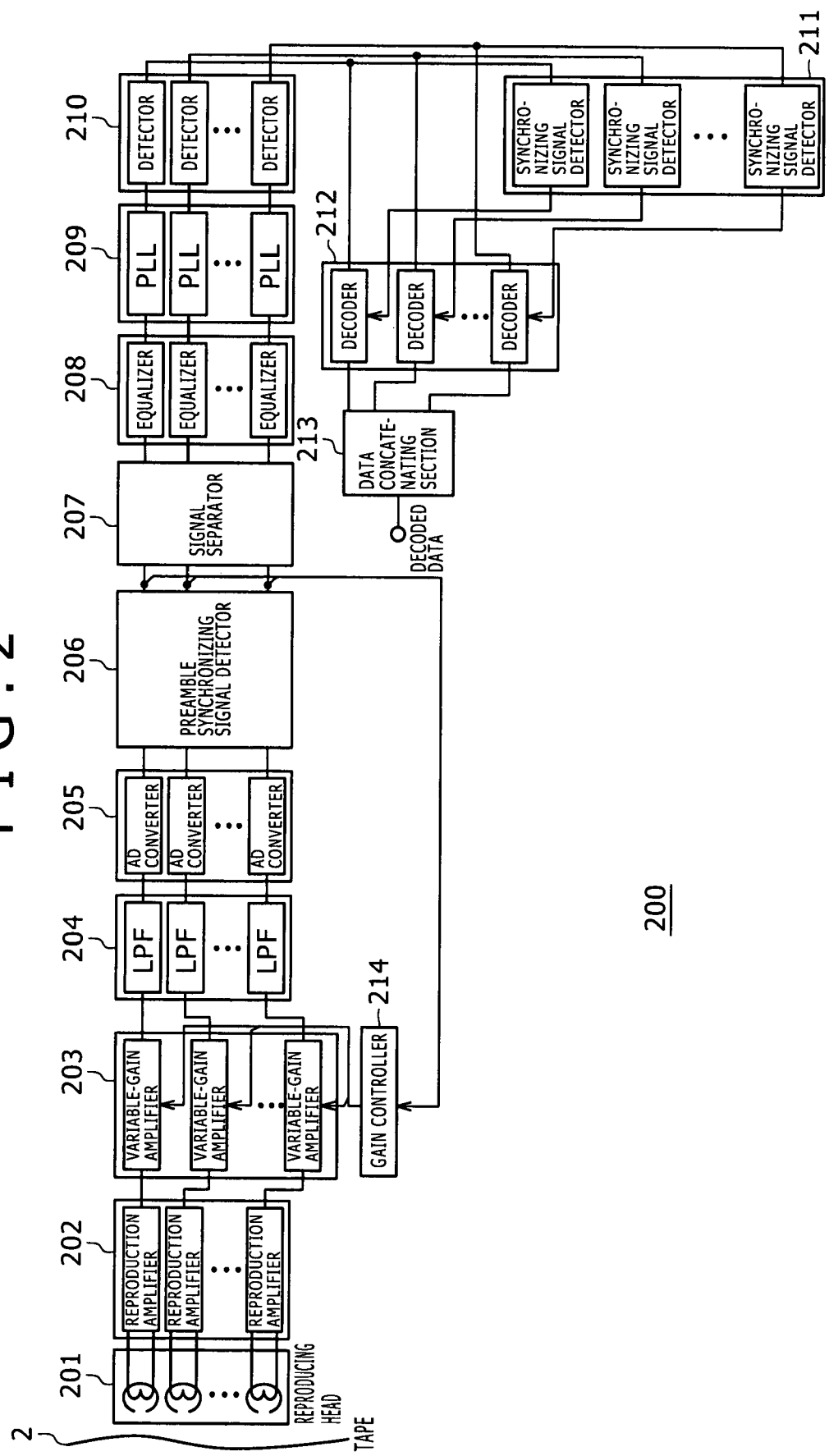
FIG. 2 is a block diagram showing the configuration of a reproducing unit of the magnetic recording/reproducing apparatus.

FIG. 1 shows the configuration of a recording apparatus of a magnetic recording/reproducing apparatus according to a first embodiment of the present invention which makes use of multi-head arrays, and FIG. 2 shows the configuration of a reproducing apparatus of the magnetic recording/reproducing apparatus. It is to be noted that the number of recording heads of the recording heady array is M whereas the number of reproducing heads of the reproducing head array is N.

First of all, the configuration of the recording apparatus 100 is described with reference to FIG. 1.

The recording apparatus 100 includes a data distributor 101, M recording encoders 102, M preamble appending sections 103, M delay devices 104, M recording compensators 105, M recording amplifiers 106 and M recording heads 107.

The data distributor 101 distributes recording data 1 inputted thereto from a terminal 108 to M groups of data equal to the number of the recording heads 107 in accordance with a certain rule. Each of the recording encoders 102 encodes the recording data distributed thereto by the data distributor 101. Each of the preamble appending sections 103 appends a preamble including a training signal, a synchronizing signal and an identification signal to the encoded recording data. Details of the preamble are hereinafter described. Each of the delay devices 104 adjusts the phase of the recording signal by providing a desired timing to the recording data to which the preamble is appended. Each of the recording compensators 105 carries out a recording compensation process for recording data to which the desired timing is provided. Each of the recording amplifiers 106 converts the recording data after the recording compensation process from a voltage into current and supplies the current to the recording head 107 associated therewith. Each of the recording heads 107 records the signal on one of M tracks associated therewith on a magnetic recording medium 2 in the form of a tape.

Referring now to FIG. 2, the reproducing apparatus 200 includes N reproducing heads 201, N reproduction amplifiers 202, N variable-gain amplifiers 203, N LPFs (low-pass filters) 204, N A/D converters 205, and a preamble synchronizing signal detector 206. The reproducing apparatus 200 further includes a signal separator 207, M equalizers 208, M PLLs 209, M detectors 210, M synchronizing signal detectors 211, M decoders 212, a data concatenating section 213 and a gain controller 214.

N weak signals read out by the N reproducing heads 201 are amplified by the N respective reproduction amplifiers 202. The variable-gain amplifiers 203 vary the gain thereof so that the amplitude levels of the output signals of the corresponding reproduction amplifiers 202 may have a predetermined value. The gain controller 214 compares reproduction signals after synchronizing signal detection by the preamble synchronizing signal detector 206 with a gain target value to control the gain of the variable-gain amplifiers 203. Each of the LPFs 204 removes unnecessary high-frequency components from a signal output of one of the variable-gain amplifiers 203 associated therewith to prevent folding-back distortion. Each of the A/D converters 205 quantizes an output of the LPF 204 associated therewith.

The preamble synchronizing signal detector 206 detects a synchronizing signal in a preamble from an output of each of the A/D converters 205 to specify the start position of an identification signal. Signals after the synchronizing signal detection by the preamble synchronizing signal detector 206 are outputted to the gain controller 214 and the signal separator 207. The signal separator 207 separates output signals of the preamble synchronizing signal detector 206 into signals individually originating from the M recording tracks using the identification signals in the preambles.

The equalizers 208 carry out waveform shaping of the reproduction signals separated for the M individual recording tracks by the signal separator 207. Each of the PLLs 209 carries out bit synchronization for an output of the equalizer 208 associated therewith. Each of the detectors 210 detects a signal bit-synchronized by the PLL 209 associated therewith. Each of the synchronizing signal detectors 211 detects a synchronizing signal of a data region from an output signal of the detector 210 associated therewith to specify the start position of data. Each of the signal decoders 212 carries out signal decoding based on an output of the detector 210 associated therewith and a result of the detection by the synchronizing signal detector 211 associated therewith. The data concatenating section 213 carries out a process inverse to the process carried out by the data distributor 101 shown in FIG. 1 to rearrange the M data in accordance with a certain rule to restore the recording data.

Next, basic recording and reproducing operation carried out by the magnetic recording/reproducing apparatus according to the present embodiment is described.

Figure 3:
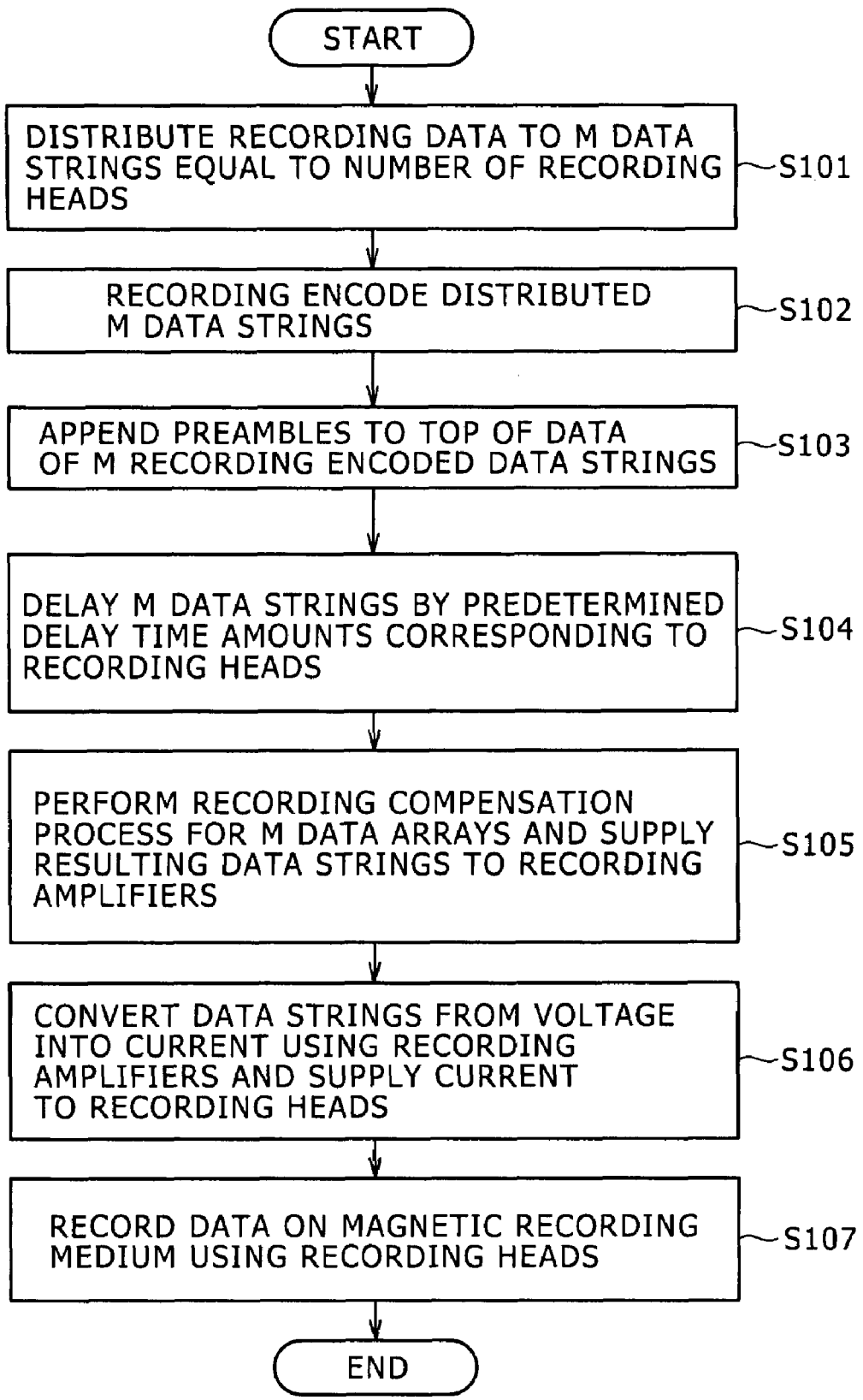
FIG. 3 is a flowchart illustrating basic operation carried out by the recording unit shown in FIG. 1.

First of all, operation the recording apparatus 100 is described. FIG. 3 illustrates basic operation for recording. Referring to FIG. 3, first at step S101, the data distributor 101 distributes recording data 1 inputted the recording apparatus 100 to M data strings equal to the number of aforementioned recording heads and supplies the M data strings to their respective recording encoders 102. Then, at step S102, the recording encoders 102 encode the M data strings supplied thereto from the data distributor 101.

Then, at step S103, the preamble appending sections 103 append respective preambles each including a training signal, a synchronizing signal and an identification signal to the top of the M data strings encoded by the recording encoders 102. Then, at step S104, the delay devices 104 delay the M data strings having the preambles appended thereto by respective required delay time amounts for the individual recording heads 107. Then, at step S105, the recording compensators 105 individually carry out recording compensation for the M data strings and supply a result of the recording compensation process to the recording amplifiers 106. Then, at step S106, each of the recording amplifiers 106 converts the data string supplied thereto from a voltage into current. Then at step S107, the recording heads 107 record the data strings supplied thereto on the magnetic recording medium 2.

Figure 4:
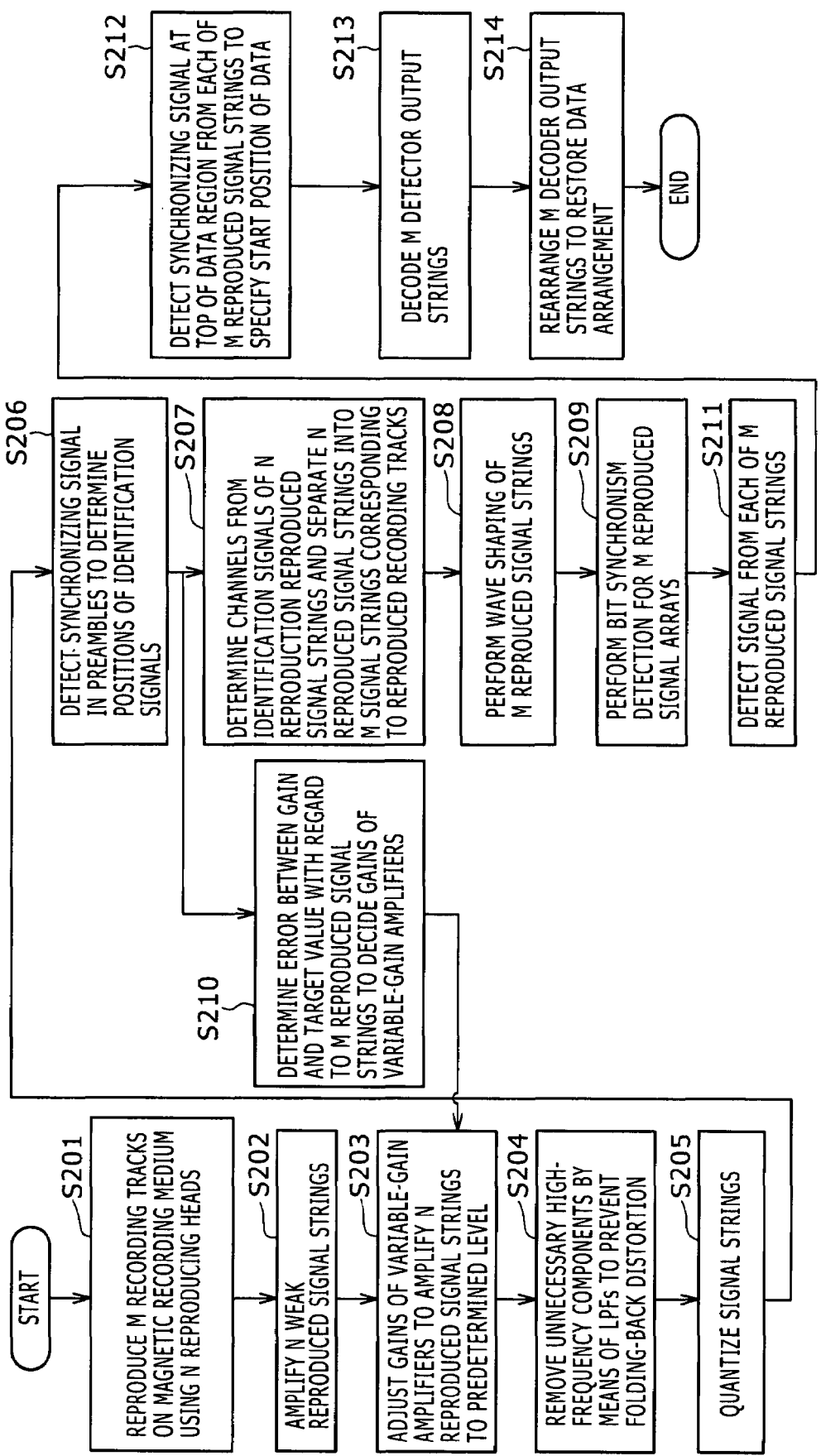
FIG. 4 is a flowchart illustrating basic operation carried out by the reproducing unit shown in FIG. 2.

Next, basic operation for reproduction carried out by the reproducing apparatus 200 is described. FIG. 4 illustrates basic operation for reproduction.

Referring to FIG. 4, first at step S201, the N reproducing heads 201 reproduce M recording tracks on the magnetic recording medium 2. Then, at step S202, the reproduction amplifiers 202 amplify the N weak signal strings individually supplied thereto from the reproducing heads 201. Then at step S203, the variable-gain amplifiers 203 adjust the gain thereof so that the N amplified signal strings have a predetermined amplitude. Then, at step S204, the LPFs 204 remove unnecessary high-frequency components from the N signal strings of the predetermined amplitude to prevent folding-back distortion. At step S205, the A/D converters 205 quantize the N reproduction signals outputted from the LPFs 204.

Then, at step S206, the preamble synchronizing signal detector 206 carries out detection of the synchronizing signal to specify the start position of the identification signals included in the preambles from the outputs of the A/D converters 205. Then, the preamble synchronizing signal detector 206 supplies the N reproduced signal strings after the synchronizing signal detection to the gain controller 214 and the signal separator 207. At step S210, the gain controller 214 determines errors between the N reproduced signal strings and the target gain value to determine the gains of the variable-gain amplifiers 203. At the same time, at step S207, the signal separator 207 determines channels from the identification signals of the N reproduced signal strings outputted from the preamble synchronizing signal detector 206 and separates the N reproduced signal strings into M reproduced signal strings corresponding to the M recording tracks from which the N reproduced signal strings originate.

Then, at step S208, the equalizers 208 carry out waveform shaping of the M reproduced signal strings separated for the individual channels. Then, at step S209, the PLLs 209 individually carry out bit synchronism detection for the reproduced signal strings. Then, at step S211, the detectors 210 detect a signal from the M reproduced signal strings which are in bit synchronism with each other. Then at step S212, each of the synchronizing signal detectors 211 detects a synchronizing signal at the top of the data region from a corresponding one of the M detected signal strings to specify the start position of the data placed in the data region. Then, at step S213, the signal decoders 212 decode the M detected signal strings. Then, at step S214, the data concatenating section 213 rearranges the M decoded signal strings to restore the original data arrangement.

Now, means for separating reproduction signals obtained from the plural reproducing heads 201 into reproduction signals for individual recording tracks is described.

In the following description, a linear tape magnetic recording/reproducing system is assumed.

A group is defined as a unit consisting of M data frames. The data frame signifies the configuration of a signal to be recorded. It is assumed that reproduction is performed, for example, by means of a single reproducing head. In this case, if the reproducing process is carried out at least M times by successively changing the reproducing position a little, then data can be reproduced from all recording tracks belonging to one group. That is to say, reproducing heads do not have to be associated with recording tracks on a one-on-one basis. For example, if reproduction is performed by N times, then only it is necessary for N resultant reproduction signals to include all M recording tracks belonging to one group at lease once without fail. Where N reproducing heads are used instead of a single reproducing head, where N<M, reproduction is performed by M/N times or more by successively changing the position of the reproducing heads. On the other hand, where N>=M, reproduction may be carried out only once.

The following description is directed to a typical case of M=4 and N=4.

Figure 5:
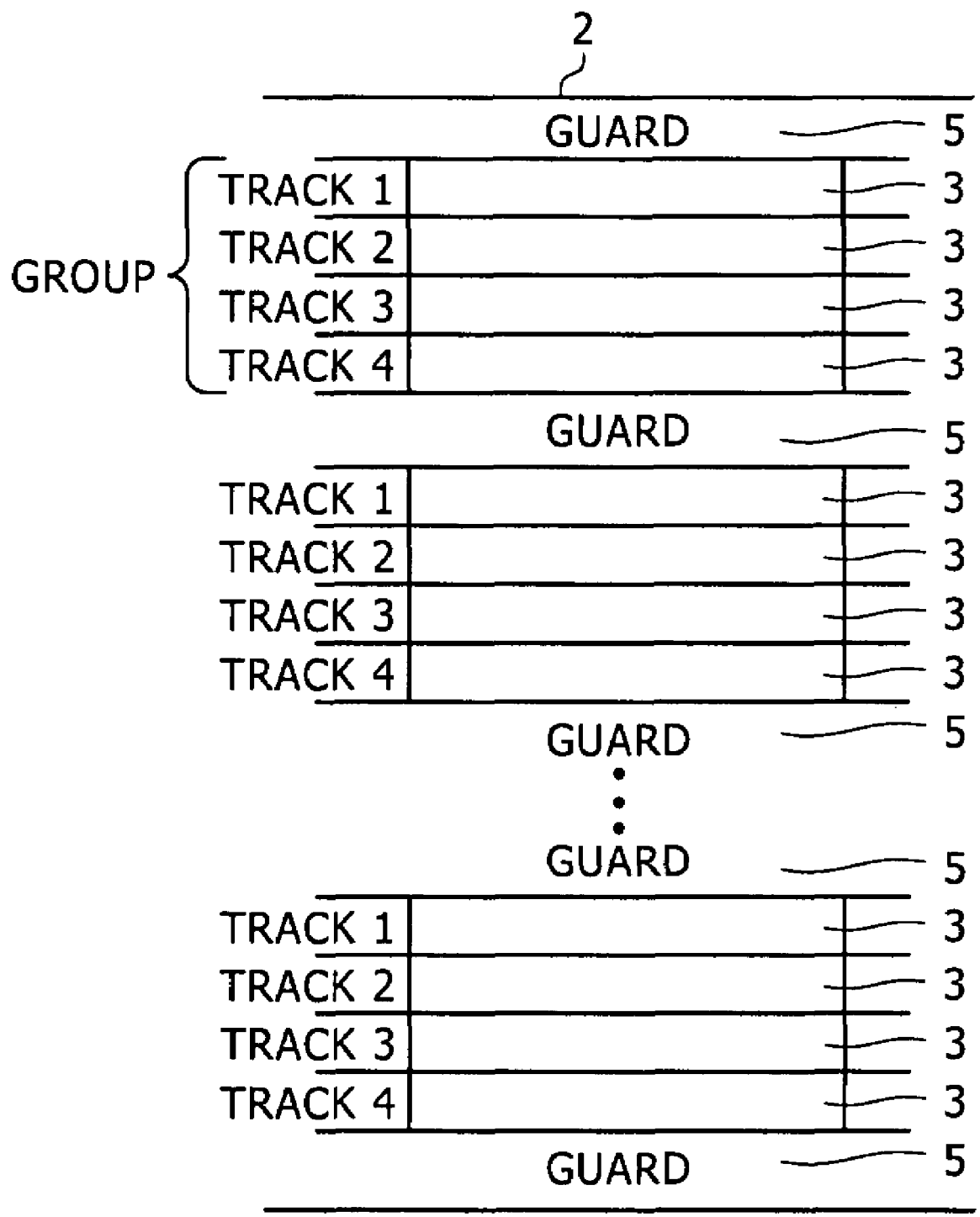
FIG. 5 is an explanatory view illustrating a method of recording data on a magnetic recording medium.

FIG. 5 illustrates a method of recording data on the magnetic recording medium 2. Referring to FIG. 5, M data frames 3 are recorded on the magnetic recording medium 2 and are handled as one group in a signal process. On the magnetic recording medium 2, a plurality of groups are arranged in parallel to each other with a guard 5, which is a region with no data recorded therein, interposed therebetween. The guards 5 are provided to prevent a signal from being inadvertently reproduced from a track belonging to an adjacent group upon reproduction. In the example shown in FIG. 5, the number of recording tracks is 4, that is, M=4, and therefore, one group is formed from four tracks, i.e., tracks 1 to 4.

Next, a preamble disposed in a data frame 3 is explained.

Figure 6:
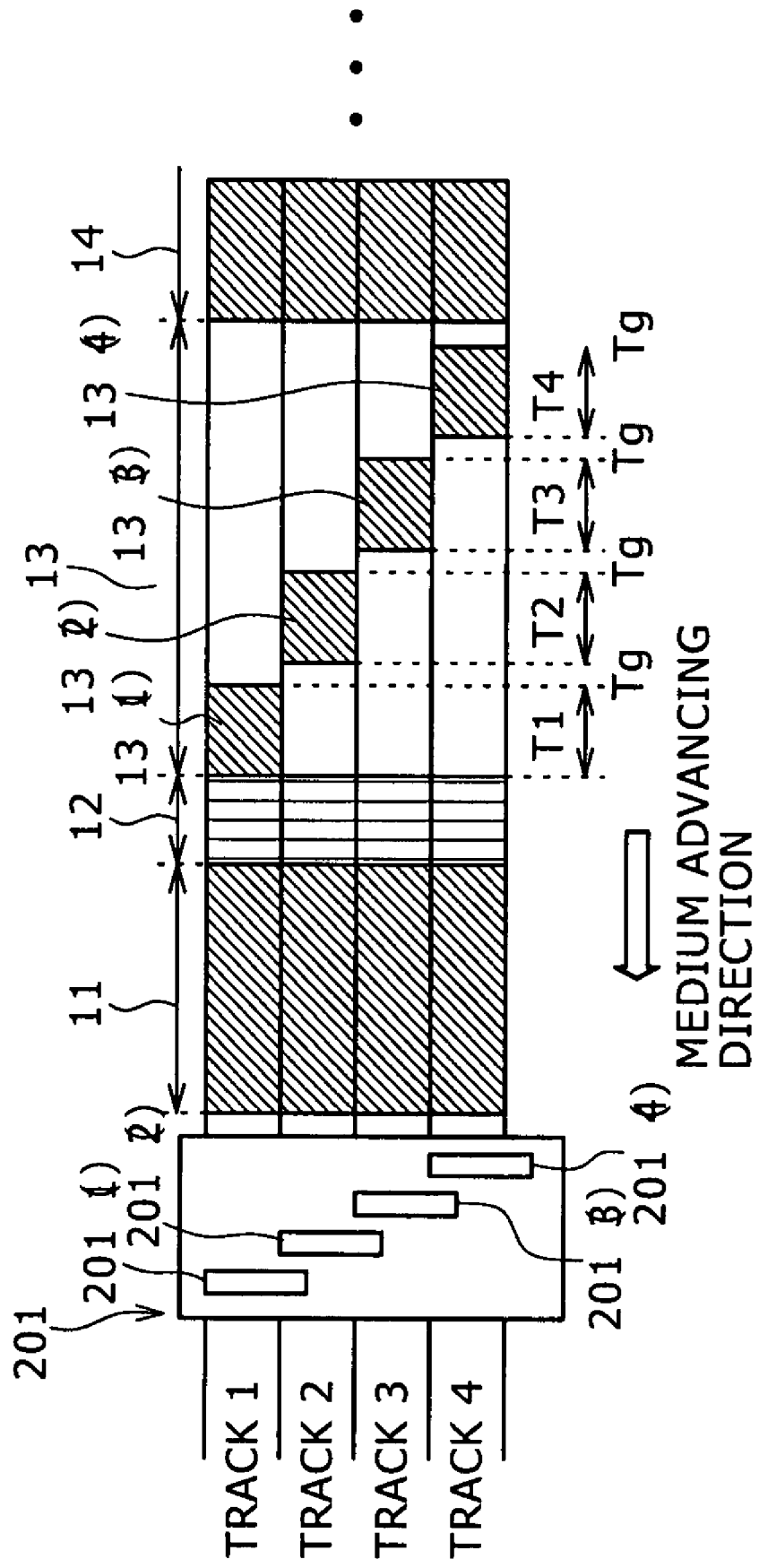
FIG. 6 is a diagram showing a configuration of preambles each recorded in a data frame where signals which are orthogonal on the time axis are used as identification signals.

FIG. 6 illustrates the configuration of preambles recorded on four data frames 3 of one group. The preambles individually include identification signals 13 used for separating N reproduction signals into M original recording signals. Signals which are orthogonal on the time axis are used for the identification signals 13.

Referring to FIG. 6, a preamble is provided at the top of each data frame 3. The preamble includes a training signal 11, a synchronizing signal 12 and an identification signal 13, which are arranged in order in the direction from the top to the end of the data frame 3. The preamble is followed by data 14. The training signal 11 is a learning signal used for training purposes in the gain controller 214, the synchronizing signal detector 211 and so forth. The preamble synchronizing signal detector 206 detects the synchronizing signal 12 to specify the start position of the identification signal 13.

The identification signals 13 are provided in the four data frames 3 on four recording tracks 1 to 4 as identification signals 13 (1), 13 (2), 13 (3) and 13 (4), which are recorded so as not to physically overlap each other and not to interfere with each other therebetween. More particularly, the identification signals 13 (1), 13 (2), 13 (3) and 13 (4) for the tracks 1, 2, 3 and 4 are recorded in segments T1, T2, T3 and T4 on the tracks 1, 2, 3 and 4, respectively. The segments T1, T2, T3 and T4 are physically displaced from each other by a predetermined time gap Tg in order to avoid mutual interference between adjacent ones of the recording tracks 1 to 4.

The identification signal 13 is a recorded signal having a wavelength equal to or greater than a minimum recording wavelength and may have repetitions of the minimum recording wavelength or a random recording wavelength. Preferably, an identical signal is used for both of the training signal 11 and the identification signal 13. This is because, for example, if the training signal 11 is recorded as a signal having repetitions of a single frequency, then since the gain controller 214 controls the gain for the single frequency, if also the identification signal 13 is recorded as a signal identical with the training signal 11, then this improves the precision in the separation process for reproduction signals hereinafter described.

It is to be noted that the recording method for the identification signals 13 described hereinabove with reference to FIG. 6 is a mere example, and the recording method is not limited to the specific recording method just mentioned.

Now, a reproduction method is described.

The width of the reproducing heads 201 is set equal to or greater than the width of recording tracks. In the case of the example shown in FIG. 6, the width of the reproducing heads 201 is set to 1.5 times the width of recording tracks. Thus, each of the reproducing heads 201 (1), 201 (2), 201 (3) and 201 (4) reproduces signals from one or more recording tracks. It is to be noted that the arrangement of the reproducing heads 201 is not limited to the typical arrangement shown in FIG. 6.

Figure 7:
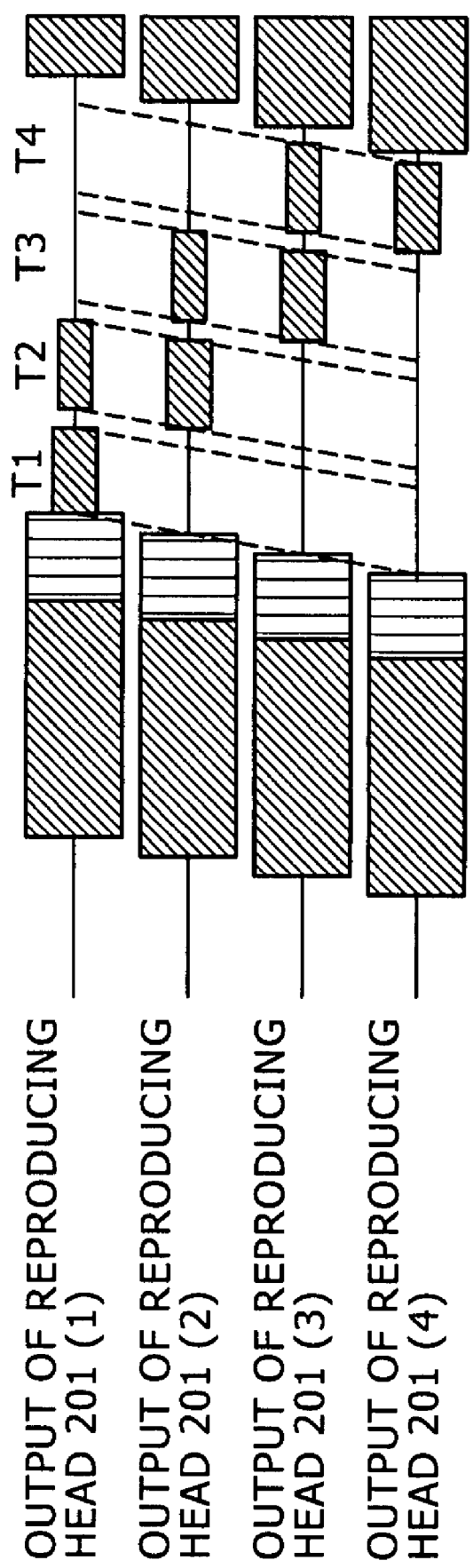
FIG. 7 is a timing chart of waveforms of signals reproduced by reproducing heads shown in FIG. 6.

FIG. 7 illustrates waveforms of signals reproduced by the reproducing heads 201 (1), 201 (2), 201 (3) and 201 (4) shown in FIG. 6. It is assumed that the recorded data vector is represented by X whereas the vector of signals reproduced by the reproducing heads 201 (1), 201 (2), 201 (3) and 201 (4) is represented by Y. In this case, the channel characteristic can be represented by a matrix of N rows and M columns, that is, 4 rows and 4 columns, and the relationship between X and Y is given by the following expression (1):

$$Y = H * X \quad (1)$$

According, if the matrix is a regular matrix, then $$X = H^{-1} * Y \quad (2)$$

is obtained by multiplying the expression (1) from the left by a generalized inverse matrix to the matrix H. Consequently, it is possible to separate reproduction signals into original recording signals originating from the recording tracks. In this case, in order for the matrix H to be a regular matrix, only it is necessary that the outputs of the reproducing heads 201 (1), 201 (2), 201 (3) and 201 (4) be different from each other.

Now, description of how to determine the 4×4 matrix H is described. Let the matrix H be expressed by the following expression (3):

$$H = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \quad (3)$$

In the example shown in FIG. 6, the reproducing head 201 (1) spans the recording tracks 1 and 2. In this case, signals reproduced by the reproducing head 201 (1) include a signal originating from the track 1 within the T1 segment, a signal originating from the track 2 appearing within the T2 segment, no signal originating from the track 3 within the T3 segment and no signal originating from the track 4 within the T4 segment as seen in FIG. 7. From the signals, elements on the first row of the matrix of the expression (3) can be determined.

In particular, the kth signal recorded on the pth (p=1, 2, 3 or 4) track is represented by $r_p(k)$, and the reproduction signal of the reproducing head 201 (1) is represented by y1(k). Thus, the element $h_{11}$ can be determined from the T1 segment in accordance with the following expression (4):

$$h_{11} = \frac{y1(k)}{r_1(k)} \quad (4)$$

As described hereinabove, a signal recorded as the identification signal 13 may have the minimum recording wavelength. However, the signals to be recorded may have a wavelength of a certain degree and an average may be taken over the T1, T2, T3 and T4 segments in order to improve the precision.

By the same token, the element $h_{12}$ can be determined from the T2 segment in accordance with the following expression (5):

$$h_{12} = \frac{y1(k)}{r_2(k)} \quad (5)$$

In the same way, the elements $h_{13}$ and $h_{14}$ can be determined from the T2 and T3 segments, respectively. However, since no signal appears in the T2 and T3 segments, the elements $h_{13}$ and $h_{14}$ are both zero as indicated by the following expression (6):

$$h_{13} = h_{14} = 0 \quad (6)$$

Next, a reproduction signal of the reproducing head 201 (2) is studied. Where the reproducing head 201 (2) spans the recording tracks 2 and 3, signals reproduced by the reproducing head 201 (2) include no signal originating from the track 1 within the T1 segment, a signal originating from the track 2 within the T2 segment, a signal originating from the track 3 within the T3 segment and no signal originating from the track 4 within the T4 segment as seen from the timing chart of the reproducing head 201 (2) shown in FIG. 7. From the signals, elements on the second row of the matrix of the expression (3) can be determined.

In the following expressions, the signal reproduced by the reproducing head 201 (2) is represented by y2(k). Since no signal appears within the T1 segment, the element $h_{21}$ is determined from the T1 segment in accordance with the following expression (7):

$$h_{21} = 0 \quad (7)$$

The element $h_{22}$ is determined from the T2 segment as given by the following expression (8):

$$h_{22} = \frac{y2(k)}{r_2(k)} \quad (8)$$

The element $h_{23}$ is determined from the T3 segment as given by the following expression (9):

$$h_{23} = \frac{y2(k)}{r_3(k)} \quad (9)$$

Since no signal appears within the T4 segment, the element $h_{24}$ is determined from the T1 segment as given by the following expression (10):

$$h_{24} = 0 \quad (10)$$

Next, a signal reproduced by the reproducing head 201 (3) is studied. Where the reproducing head 201 (3) spans the tracks 3 and 4, signals reproduced by the reproducing head 201 (3) include no signals within the T1 segment and the T2 segment, a signal originating from the track 3 within the T3 segment and a signal originating from the track 4 within the T4 segment as seen from the timing chart of the reproducing head 201 (4) shown in FIG. 7. From the signals, elements on the third row of the matrix of the expression (3) can be determined as follows.

In the following equations, the signal reproduced from the reproducing head 201 (3) is represented by y3(k) Since no signals appear within the T1 and T2 segments, the elements $h_{31}$ and $h_{32}$ can be determined from the T1 and T2 segments by the following expression (11):

$$h_{31} = h_{32} = 0 \quad (11)$$

The element $h_{33}$ is determined from the T3 segment by the following expression (12):

$$h_{33} = \frac{y3(k)}{r_3(k)} \quad (12)$$

The element $h_{34}$ is determined from the T4 segment by the following expression (13):

$$h_{34} = \frac{y3(k)}{r_1(k)} \quad (13)$$

Finally, a signal reproduced from the reproducing head 201 (4) is studied. Where the reproducing head 201 (4) spans the track 4 and a guard region, signals reproduced by the reproducing head 201 (4) include no signals originating from the tracks 1, 2 and 3 within the T1, T2 and T3 segments, and a signal originating from the track 4 within the T4 segment as seen from the timing chart of the reproducing head 201 (4) shown in FIG. 7. From the signals, elements on the fourth row of the matrix of the expression (3) can be determined as follows.

In the following equations, the signal reproduced by the reproducing head 201 (4) is represented by y4(k). Since no signals appear within the T1, T2 and T3 segments, the elements $h_{41}$, $h_{42}$ and $h_{43}$ are determined from the T1, T2 and T3 segments by the following expression (14):

$$h_{41} = h_{42} = h_{43} = 0 \quad (14)$$

The element $h_{44}$ is determined from the T4 segment by the following expression (15):

$$h_{44} = \frac{y4(k)}{r_4(k)} \quad (15)$$

The matrix H is determined in such a manner as described above. Accordingly, if a generalized inverse matrix to the matrix H is determined, then signals corresponding to original recording signals can be separated from the reproduction signals in accordance with the expression (2).

Now, a recording/reproducing method is described wherein signals which are orthogonal on the frequency axis are used as the identification signals 13 for separating N reproduction signals into M original recording signals.

First of all, a recording method is described with reference to FIG. 8.

For the recording method for a case wherein M=4 and N=4, much complicated description is required. For this reason, the following description is given of the recording method for a simple case wherein M=2 and N=2.

Figure 8:
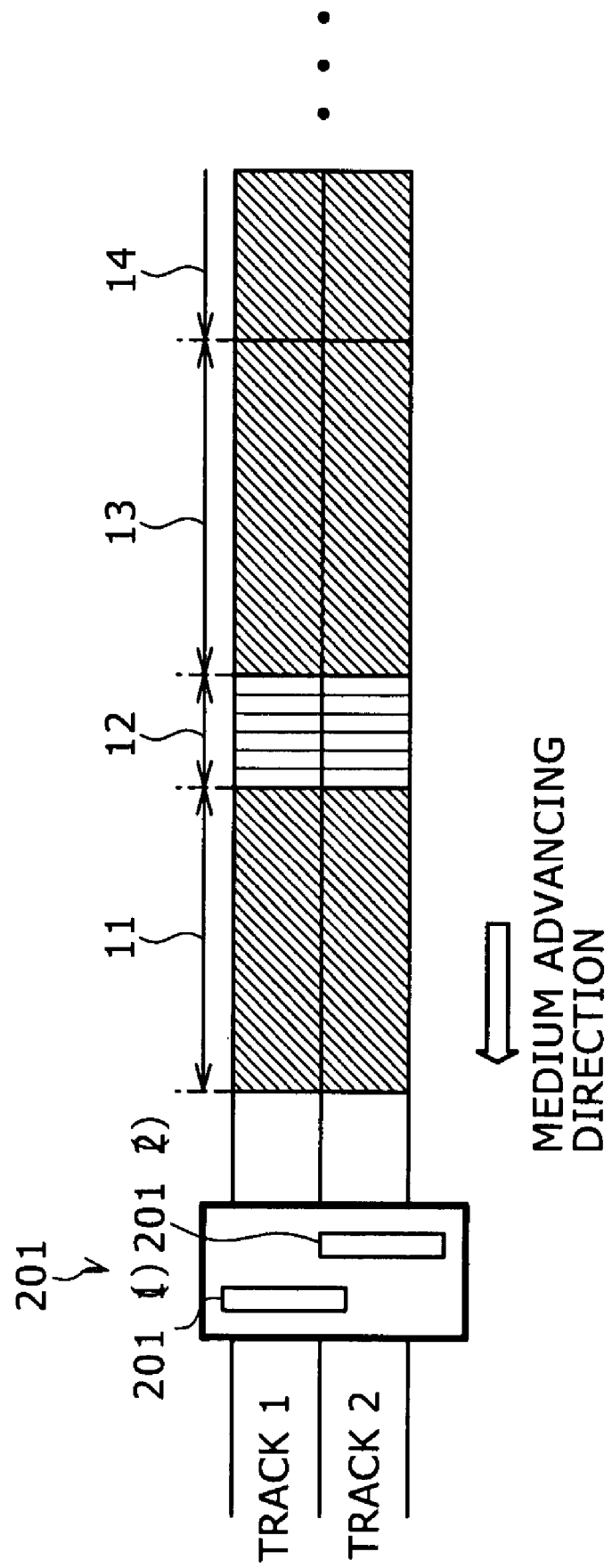
FIG. 8 is a diagram showing a configuration of preambles each recorded in a data frame where signals which are orthogonal on the frequency axis are used as identification signals.

FIG. 8 shows the configuration of a preamble placed in a data frame 3 where signals which are orthogonal on the frequency axis are used as an identification signal.

Referring to FIG. 8, the preamble placed at the top of the data frame 3 includes a training signal 11, a synchronizing signal 12 and an identification signal 13, which are arranged in order in the direction from the top to the end of the data frame 3. The preamble is followed by data 14. The training signal 11 is a learning signal used for training purposes in the gain controller 214, the synchronizing signal detector 211 and so forth. The preamble synchronizing signal detector 206 detects the synchronizing signal 12 immediately preceding the identification signal 13 to specify the start position of the identification signal 13. As described above, signals which are orthogonal on the frequency axis are used for the identification signals 13 for the recording tracks.

The signals which are orthogonal on the frequency axis have frequencies each represented by the values 0 and 1 each repeated consecutively $2^k$ times where k=0, 1, 2 and so on like "10", "1100" and "11110000". For k=0, the orthogonal signals are "10" consisting of the values 0 and 1 each repeated consecutively one time. For k=1, the orthogonal signals are "1100" consisting of the values 0 and 1 each repeated consecutively two times. For k=2, the orthogonal signals are "11110000" consisting of the values 0 and 1 each repeated consecutively four times. In the configuration shown in FIG. 8, the frequency "1010", which is orthogonal signals consisting of the values 0 and 1 each repeated consecutively one time, is used for the track 1 while the frequency "1100", which is orthogonal signals consisting of the values 0 and 1 each repeated consecutively two times, is used for the track 2. In this case, the frequency of the orthogonal signals is four times the frequency of the signal to be recorded. Here, "1011" is used for the identification signal. It is to be noted, however, that the frequency is not particularly limited to this. Then, the values "1" and "0" of the identification signal and the orthogonal signals, which are both represented in terms of the two values "1" and "0", are replaced with the values "−1" and "+1" respectively. Thus, the orthogonal signals of "1010" for the track 1 are replaced with orthogonal signals of "−1+1−1+1", the orthogonal signals of "1100" for the track 2 are replaced with orthogonal signals of "−1−1+1+1" and the identification signal 13 of "1011" is replaced with an identification signal 13 of "−1+1−1−1".

A signal to be recorded on the track 1 is obtained by multiplying the identification signal of "−1+1−1−1" by the orthogonal signals of "−1+1−1+1" and is represented by the following expression (16):

$$+1-1+1-1-1+1-1+1+1-1+1-1+1-1+1-1 \quad (16)$$

By the same token, a signal to be recorded on the track 2 is obtained by multiplying the identification signal of "−1+1−1−1" by the orthogonal signals of "−1−1+1+1" and is represented by the following expression (17):

$$+1+1-1-1-1+1+1+1+1-1-1+1+1-1-1 \quad (17)$$

In reproduction, by multiplying the expression (16) by the orthogonal signals of "−1+1−1+1" used for the track 1, the following expression (16) is obtained:

$$-1-1-1-1+1+1+1+1-1-1-1-1-1-1-1-1 \quad (18)$$

By integrating the expression (18) with respect to the frequency of the recorded signal, that is, by integrating the expression (18) for every 4 symbols, the following expression (19) is obtained:

$$-4+4-4-4 \quad (19)$$

Then, by applying threshold value detection or averaging for each four symbols to the expression (19), the original identification signal of "−1+1−1−1" can be restored.

On the other hand, by multiplying the expression (17) by the orthogonal signals of "−1+1−1+1" used for the track 1, the following expression (20) is obtained:

$$-1+1+1-1+1-1-1+1-1+1+1-1-1+1+1-1 \quad (20)$$

By integrating the expression (20) for every 4 symbols, the following expression (21) is obtained:

$$0\ 0\ 0\ 0 \quad (21)$$

Therefore, even if the expression (16) representing the signal recorded on the track 1 includes the signal recorded on the track 2, the signal of the track 2 disappears.

Next, the reproducing method is described particularly.

The width of each reproducing head 201 is set equal to or greater than the width of a recording track. In the example shown in FIG. 8, the width of the reproducing heads 201 is set to 1.5 times the width of the recording tracks. Thus, each of the reproducing heads 201 (1) and 201 (2) reproduces signals from at least one recording track. It is to be noted that the arrangement of the reproducing heads 201 is by no means limited to that shown in FIG. 8.

Figure 9:
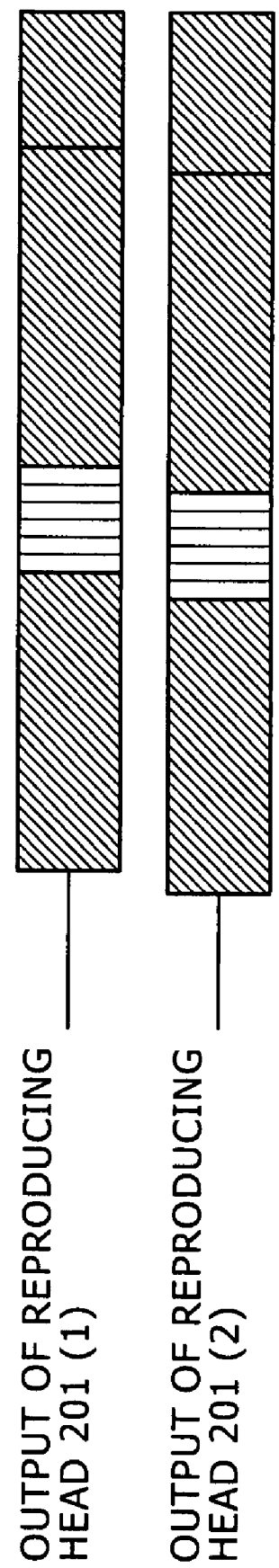
FIG. 9 is a timing chart of waveforms of signals reproduced by reproducing heads shown in FIG. 8.

FIG. 9 illustrates waveforms of signals reproduced by the reproducing heads 201 (1) and 201 (2) shown in FIG. 8.

In this case, the matrix H of the expression (3) is given as a 2×2 matrix of the following expression (22):

$$H = \begin{bmatrix} h_{11} & h_{12} \\ h_{21} & h_{22} \end{bmatrix} \quad (22)$$

Determination of the matrix H is described below.

The elements on the first row of the matrix H of the expression (22) are determined from signals reproduced by the reproducing head 201 (1). In the example shown in FIG. 8, the reproducing head 201 (1) spans the tracks 1 and 2. In this case, a signal recorded in the kth recording operation where k=1, 2, ... and 16 and reproduced by the reproducing head 201 (1) is represented by $y_k$.

The element $h_{11}$ of the matrix H of the expression (22) is determined from a signal of the track 1 included in the reproduced signal $y_k$. Thus, the reproduced signal $y_k$ is multiplied by the orthogonal signal of "−1+1−1+1" for the track 1 as given by the following expression (23):

$$-y_1+y_2-y_3+y_4-y_5+y_6-y_7+y_8-y_9+y_{10}-y_{11}+y_{12}-y_{13}+y_{14}-y_{15}+y_{16} \quad (23)$$

Then, an average of every four symbols in the expression (23) is computed, and each of the computed averages is divided by the corresponding identification signal. Consequently, the following expression (24) is obtained:

$$\frac{-y_1+y_2-y_3+y_4}{4 \cdot -1} \quad \frac{-y_5+y_6-y_7+y_8}{4 \cdot +1} \quad (24)$$
$$\frac{-y_9+y_{10}-y_{11}+y_{12}}{4 \cdot -1} \quad \frac{-y_{13}+y_{14}-y_{15}+y_{16}}{4 \cdot -1}$$

Further, an average of the four computation results of the expression (24) is determined to determine the element $h_{11}$.

By the same token, the element $h_{12}$ of the matrix H of the expression (22) is determined from a signal of the track 2 included in the reproduced signal $y_k$. Then, the reproduced signal $y_k$ is multiplied by the orthogonal signal of "−1−1+1+1" for the track 2 and hence given by the following expression (25):

$$-y_1-y_2+y_3+y_4-y_5-y_6+y_7+y_8-y_9-y_{10}+y_{11}+y_{12}-y_{13}-y_{14}+y_{15}+y_{16} \quad (25)$$

Then, an average of every four symbols of the expression (25) is computed, and each of the computed averages is divided by the corresponding identification signal. Consequently, the following expression (26) is obtained:

$$\frac{-y_1-y_2+y_3+y_4}{4 \cdot -1} \quad \frac{-y_5-y_6+y_7+y_8}{4 \cdot +1} \quad (26)$$
$$\frac{-y_9-y_{10}+y_{11}+y_{12}}{4 \cdot -1} \quad \frac{-y_{13}-y_{14}+y_{15}+y_{16}}{4 \cdot -1}$$

Thereafter, an average of the four computation results of the expression (26) is further determined to determine the element $h_{12}$.

In the same way, the elements on the second row of the matrix H of the expression (22) are determined from signals reproduced by the reproducing head 201 (2). In the example shown in FIG. 8, the reproducing head 201 (2) spans the track 2 and the area of a guard. Much like the reproducing head 201 (1), a signal recorded in the kth recording operation where k=1, 2, ... and 16 and reproduced by the reproducing head 201 (2) is represented by $y_k$.

Since the reproduced signal $y_k$ does not include a signal originating from the track 1, the element $h_{21}$ of the matrix H of the expression (22) is represented by the following expression (27):

$$h_{21}=0 \quad (27)$$

Then, the element $h_{22}$ of the matrix H of the expression (22) is determined. In particular, the reproduced signal $y_k$ is multiplied by the orthogonal signal of "−1−1+1+1" for the track 2 as represented by the following expression (28):

$$-y_1-y_2+y_3+y_4-y_5-y_6+y_7+y_8-y_9-y_{10}+y_{11}+y_{12}-y_{13}-y_{14}+y_{15}+y_{16} \quad (28)$$

Then, an average of every 4 symbols of the expression (28) is computed and each of the computed averages is divided by the corresponding identification signal as given by the following expression (29):

$$\frac{-y_1-y_2-y_3+y_4}{4 \cdot -1} \quad \frac{-y_5-y_6+y_7+y_8}{4 \cdot +1} \quad (29)$$
$$\frac{-y_9-y_{10}+y_{11}+y_{12}}{4 \cdot -1} \quad \frac{-y_{13}-y_{14}+y_{15}+y_{16}}{4 \cdot -1}$$

Then, an average of the four computation results of the expression (29) is further determined to determine the element $h_{22}$.

Finally, a recording/reproducing method where orthogonal signals are used for the identification signals 13 for separating N reproduction signals into M original recording signals is described.

First of all, the recording method is described with reference to FIG. 10. The following description is given for M=4 and N=4.

Figure 10:
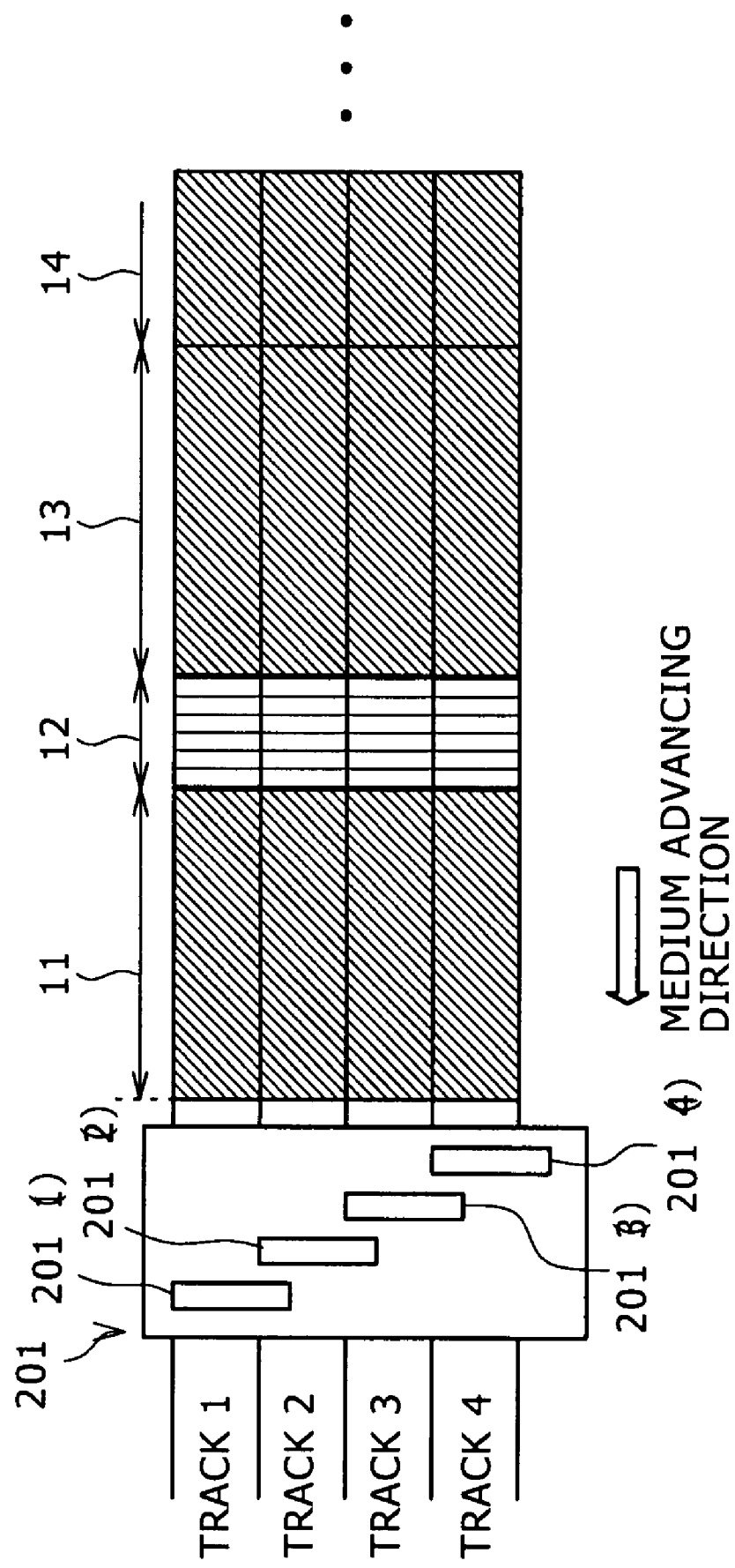
FIG. 10 is a diagram showing a configuration of preambles recorded in data frames where orthogonal codes are used as identification signals.

FIG. 10 shows the configuration of preambles placed in the data frames 3 where orthogonal codes are used for the identification signals 13.

Referring to FIG. 10, a preamble is provided at the top of each data frame 3. The preamble includes a training signal 11, a synchronizing signal 12 and an identification signal 13, which are arranged in order in the direction from the top to the end of the data frame 3. The preamble is followed by data 14. The training signal 11 is a learning signal used for training purposes in the gain controller 214, the synchronizing signal detector 211 and so forth. The preamble synchronizing signal detector 206 detects the synchronizing signal 12 to specify the start position of the identification signal 13. As the identification signal 13, an orthogonal code is used for each of recording tracks.

The following description is given of a typical case in which the commonly known Hadamard matrix is used for the orthogonal codes to be used as the identification signals 13.

In recording, a Hadamard matrix of order 4 is used because of M=4. This Hadamard matrix of order 4 is given by the following expression (30):

$$C = \begin{bmatrix} +1 & +1 & +1 & +1 \\ +1 & -1 & +1 & -1 \\ +1 & +1 & -1 & -1 \\ +1 & -1 & -1 & +1 \end{bmatrix} \quad (30)$$

Rows of the above matrix are used as the identification signals 13. In particular, the first, second, third and fourth rows are allocated to the tracks 1, 2, 3 and 4, respectively. However, the allocation of such rows is not limited to this. Further, although the matrix of the expression (30) is used as it is in order to make the explanation simple, a proper sequence may be used in place of the matrix of the expression (30). Thus, these signals are recorded by, for example, inverting the phase for the signal "−1".

Next, a reproducing method is described.

The width of each reproducing head 201 is set equal to or greater than the width of a recording track. In the example shown in FIG. 10, the width of the reproducing heads 201 is set to 1.5 times the width of the recording tracks. Thus, each of the reproducing heads 201 (1), 201 (2), 201 (3) and 201 (4) reproduces signals from at least one recording track. It is to be noted, however, that the arrangement of the reproducing heads 201 is by no means limited to that shown in FIG. 10.

Figure 11:
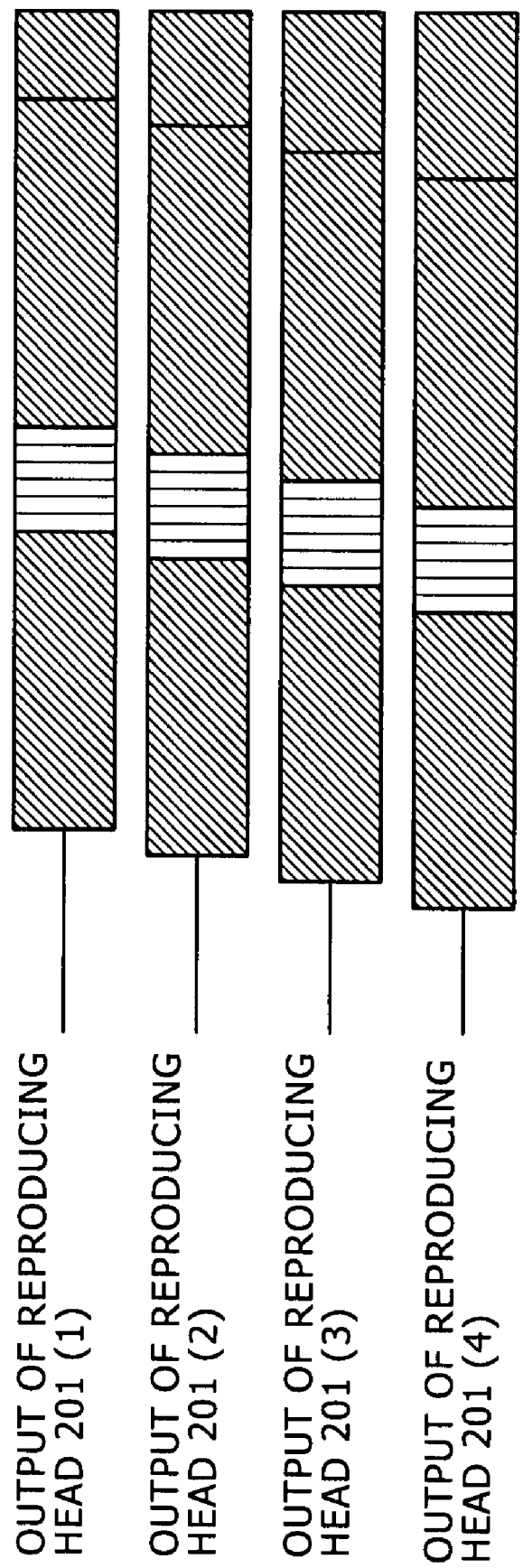
FIG. 11 is a timing chart of waveforms of signals reproduced by reproducing heads shown in FIG. 10.

FIG. 11 illustrates waveforms of signals reproduced by the reproducing heads 201 (1), 201 (2), 201 (3) and 201 (4) shown in FIG. 10.

By carrying out a Hadamard conversion process on reproduction signals, the reproduction signals can be separated into original recording signals. Thus, by multiplying the opposite sides of the expression (1) by the Hadamard matrix of the expression (30) from the right side, the following expression (31) is obtained:

$$YC = HXC = HCC = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \quad (31)$$

$$\begin{bmatrix} +1 & +1 & +1 & +1 \\ +1 & -1 & +1 & -1 \\ +1 & +1 & -1 & -1 \\ +1 & -1 & -1 & +1 \end{bmatrix} \begin{bmatrix} +1 & +1 & +1 & +1 \\ +1 & -1 & +1 & -1 \\ +1 & +1 & -1 & -1 \\ +1 & -1 & -1 & +1 \end{bmatrix}$$

Thus, $$YC = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \cdot 4 \begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad (32)$$

$$= 4 \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix}$$

$$= 4H$$

Thus, the matrix H can be determined in accordance with the following expression (33):

$$H = \frac{1}{4} YC \quad (33)$$

The identification signal 13 described above needs to be always placed forwardly of the data region 14. However, the identification signal can be embedded also in the data region in order to closely associate the identification signal 13 and the data 14 with each other. In this way, it is possible to improve the association of the identification signal 13 with the data 14 even for a case in which the relations between the positions of the reproducing heads 201 and the recording tracks change as a result of deformation of the magnetic recording medium 2.

Second Embodiment

Now, a magnetic recording/reproducing apparatus according to a second embodiment of the present invention which employs a single recording head and a single reproducing head is described with reference to FIGS. 12 to 15.

Figure 12:
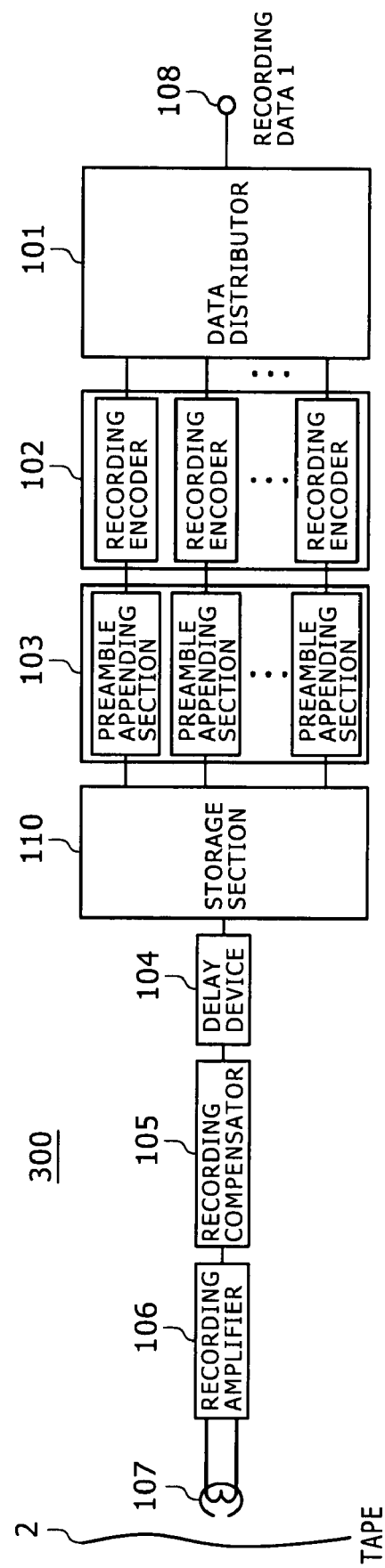
FIG. 12 is a block diagram showing the configuration of a recording unit of a magnetic recording/reproducing apparatus according to a second embodiment of the present invention which makes use of a single head array.
Figure 13:
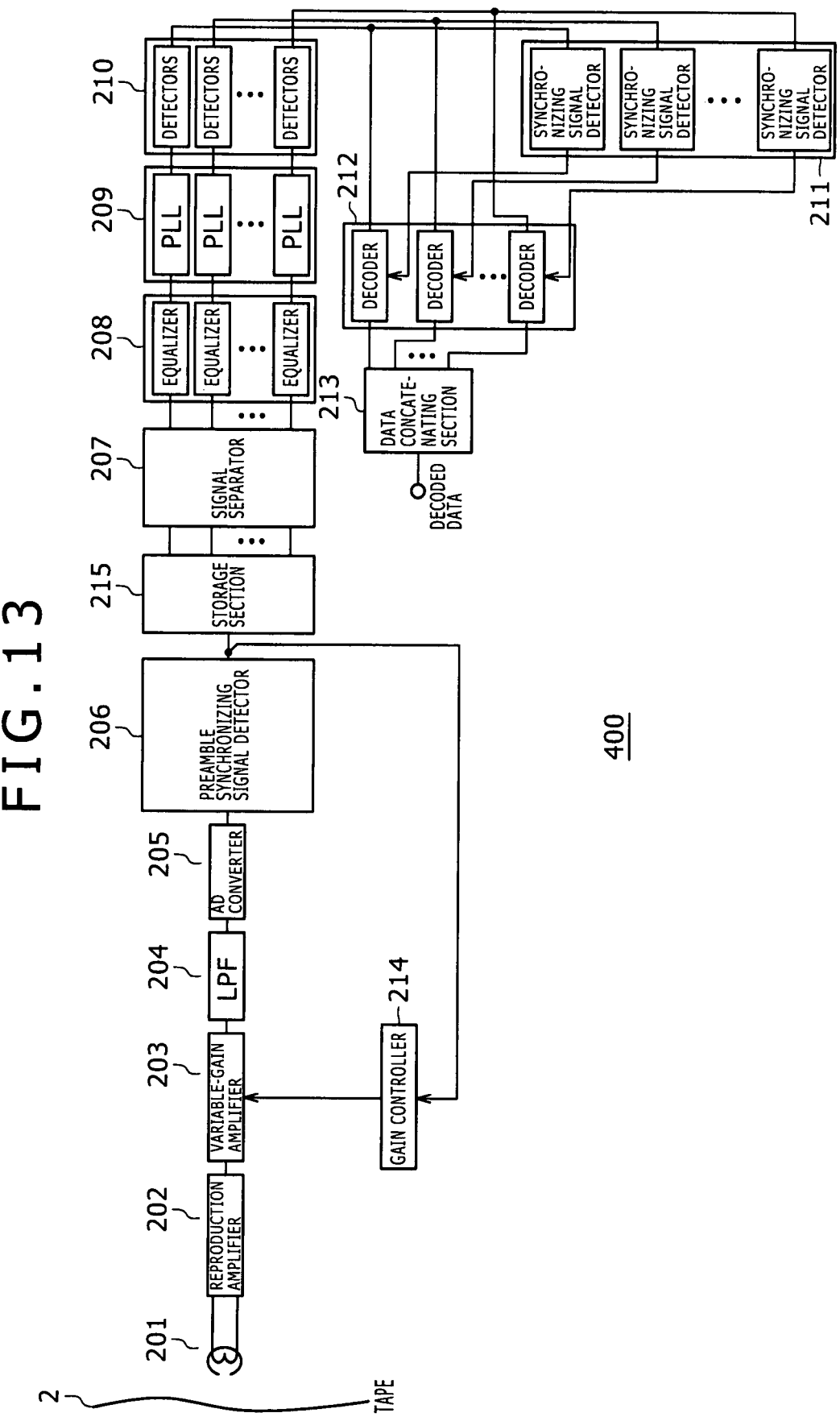
FIG. 13 is a block diagram showing the configuration of a reproducing unit of the magnetic recording/reproducing apparatus.

FIG. 12 shows the configuration of a recording apparatus of the magnetic recording/reproducing apparatus according to the present embodiment, and FIG. 13 shows the configuration of a reproducing apparatus of the magnetic recording/reproducing apparatus.

Referring first to FIG. 12, the recording apparatus 300 includes a data distributor 101, M recording encoders 102, and M preamble appending sections 103 similarly as in the recording apparatus 100 described hereinabove with reference to FIG. 1. However, the recording apparatus 300 is different from the recording apparatus 100 in that it includes a single delay device 104, a single recording compensator 105, a single recording amplifier 106 and a single recording head 107. The recording apparatus 300 is different also in that it additionally includes a storage section 110 interposed between the preamble appending sections 103 and the delay device 104 for storing data to be recorded as data belonging to one group.

Referring now to FIG. 13, the reproducing apparatus 400 shown includes a preamble synchronizing-signal detector 206, a signal separator 207, M equalizers 208, M PLLs 209, M detectors 210, M synchronizing signal detectors 211, M decoders 212, a data concatenating section 213 and a gain controller 214 similarly as in the reproducing apparatus 200 described hereinabove with reference to FIG. 2. However, the reproducing apparatus 400 is different from the reproducing apparatus 200 in that it includes a single reproducing head 201, a single reproduction amplifier 202, a single variable-gain amplifier 203, a single LPF 204, and a single A/D converter 205. The reproducing apparatus 400 is different also in that it additionally includes a storage apparatus 215 interposed between the preamble synchronizing signal detector 206 and the signal separator 207 for storing reproduced data therein. In one reproducing operation, the reproducing head 201 reproduces data from all recording tracks belonging to one group. That is to say, a reproduced signal is stored into the storage section 215 for every reproducing process, which is carried out repeatedly until all recording tracks are reproduced at least once.

Next, basic recording and reproducing operation carried out by the magnetic recording/reproducing apparatus according to the embodiment is described.

Figure 14:
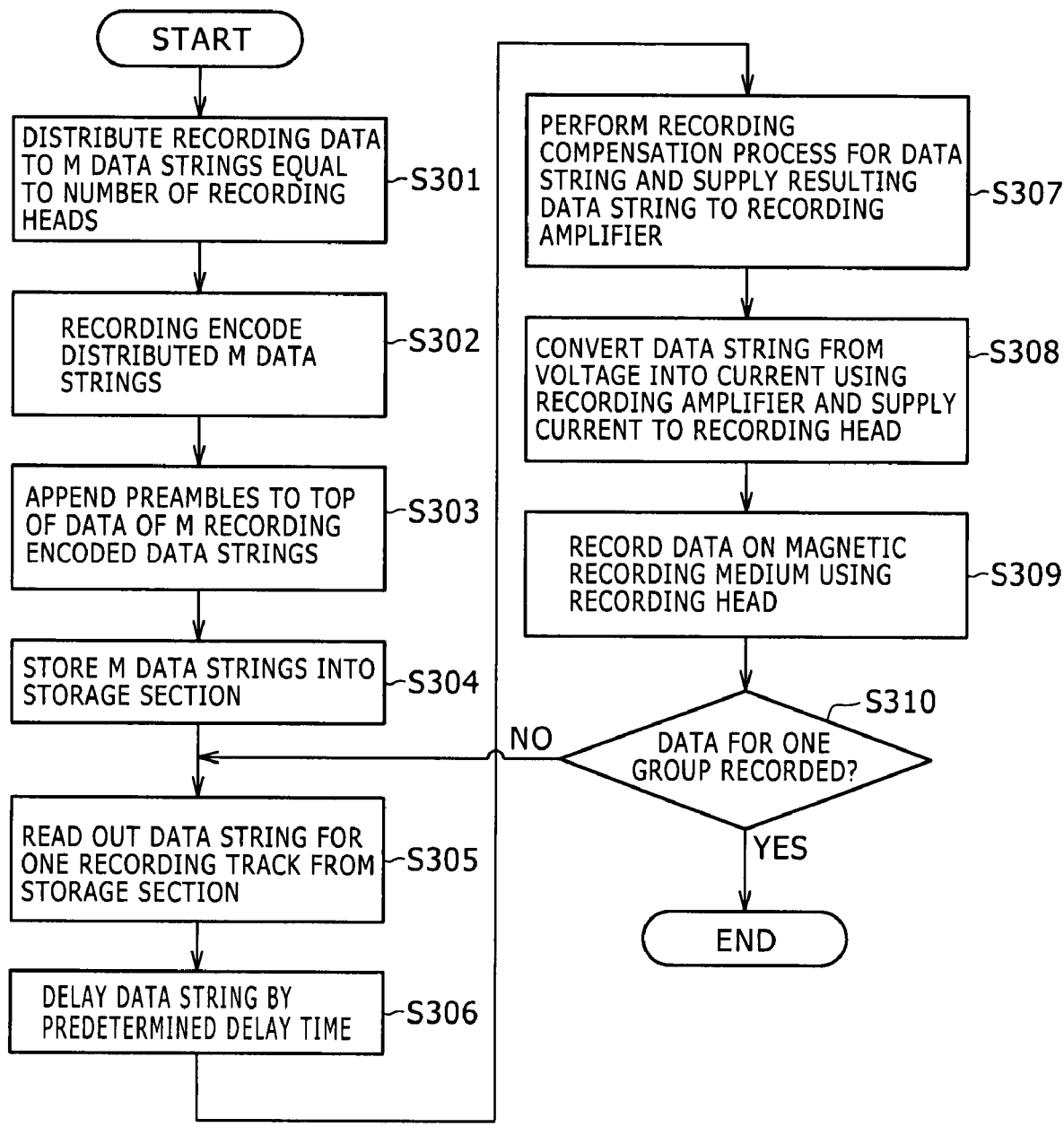
FIG. 14 is a flowchart illustrating basic operation carried out by the recording unit shown in FIG. 12.

First of all, basic recording operation carried out by the recording apparatus 300 is described. FIG. 14 illustrates the basic recording operation.

Referring to FIG. 14, first at step S301, the data distributor 101 distributes recording data 1 inputted to the recording apparatus 300 to M data strings. Then, at step S302, the recording encoders 102 individually encode the M data strings distributed thereto. Then at step S303, each of the preamble appending sections 103 appends a preamble including a training signal, a synchronizing signal and an identification signal to the top of a corresponding one of the M data strings supplied thereto. Then, at step S304, the M data strings produced in this manner are stored into the storage section 110.

Subsequently, at step S305, the delay device 104 reads out a data string for one recording track from the storage section 110. Then, at step S306, the delay device 104 delays the data string by predetermined delay time and supplies the delayed data string to the recording compensator 105. Subsequently, at step S307, the recording compensator 105 carries out recording compensation for the data string supplied thereto and supplies a result of the recording compensation to the recording amplifier 106. Then, at step S308, the recording amplifier 106 converts the data string supplied thereto from a voltage into current and supplies the current to the recording head 107. Subsequently, at step S309, the recording head 107 records the data string supplied thereto on a recording track on the magnetic recording medium 2.

After the operation to record data for one recording track is completed, the recording apparatus 300 decides at step S310 whether or not all data belonging to one group are recorded. If the decision indicates that not all data belonging to one group are recorded (No at step S310), then the processing returns to step S305, at which the delay device 104 reads out a next data string from the storage section 110. Then, the processes for recording at steps S306 to S310 are repeated similarly. As a matter of fact, the processes at steps S305 to S310 are carried out repeatedly in the same way until recording of all data for one group is completed.

Figure 15:
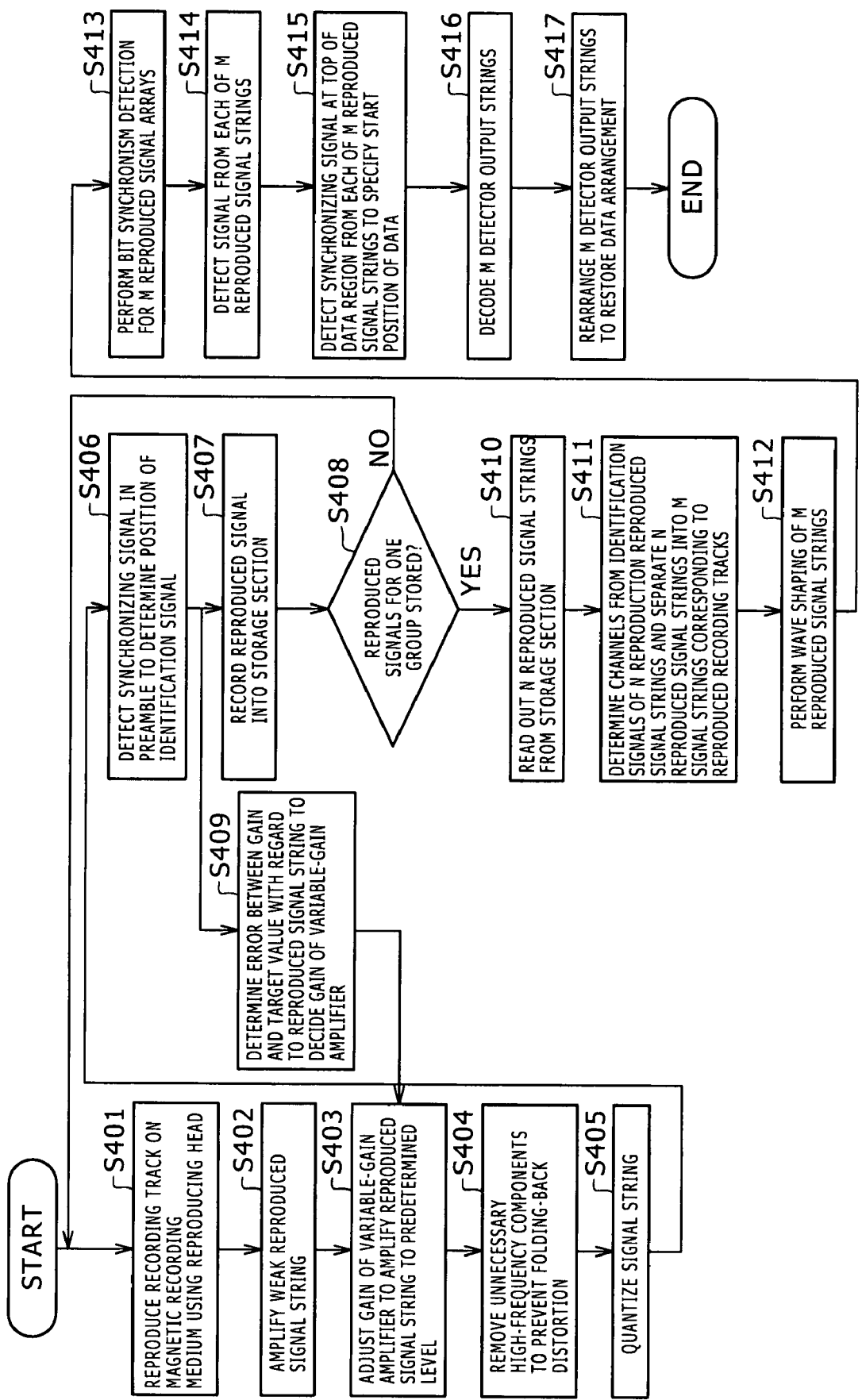
FIG. 15 is a flowchart illustrating basic operation carried out by the reproducing unit shown in FIG. 13.

Next, the basic reproducing operation carried out by the reproducing apparatus 400 is described. FIG. 15 illustrates the basic reproducing operation.

Referring to FIG. 15, the reproducing head 201 reproduces a recording track on the magnetic recording medium 2 first at step S401. Then, at step S402, the reproduction amplifier 202 amplifies a weak reproduced signal supplied thereto from the reproducing head 201. Subsequently, at step S403, the variable-gain amplifier 203 adjusts the gain of the amplified reproduced signal from the reproduction amplifier 202 to a predetermined value. Then, at step S404, the LPF 204 removes unnecessary high-frequency components from the reproduced signal after the gain adjustment to avoid foldingback distortion. Subsequently, at step S405, the A/D converter 205 quantizes the output of the LPF 204. Then, at step S406, the preamble synchronizing signal detector 206 detects the synchronizing signal of the preamble to determine the start position of the identification signal included in the preamble. Further, the reproduced signal is supplied from the preamble synchronizing signal detector 206 to the gain controller 214. Subsequently, at step S409 following the step S406, the gain controller 214 determines an error of the reproduced signal from a target gain value to determine the gain of the variable-gain amplifier 203. At the same time, the reproduced signal from the preamble synchronizing signal detector 206 is stored into the storage section 215 at step S407 following the step S406. At step S408, it is decided whether or not reproduced signal strings belonging to one group are stored in the storage section 215 every time one recording track is reproduced. If it is decided that such reproduced signal strings are not stored in the storage section 215 (No at step S408), then the processing returns to step S401 to reproduce data from a next recording track. Then, the processes at steps S401 to S408 are repeated until reproduced signal strings belonging to 1 group are stored into the storage section 215.

After reproduced signal strings belonging to one group are stored into the storage section 215 (Yes at step S408), the signal separator 207 reads out the reproduction signals belonging to one group from the storage section 215. Then, at step S411, the signal separator 207 determines channels using the identification signals of the read out reproduction signals and separates the reproduction signals into M signal strings individually originating from the M recording tracks on the basis of channels.

Then, at step S412, the equalizers 208 carry out a wave formation process for the M separated reproduced signal strings. Subsequently, at step S413, the PLLs 209 carry out bit synchronization detection for the M reproduced signal strings. Then, at step S414, the detectors 210 detect signals from the M bit-synchronized reproduced signal strings. Subsequently, at step S415, the synchronizing signal detectors 211 detect the synchronizing signals at the top of the data region from the M detected signal strings to specify the start positions of the data. Then, at step S416, the decoders 212 decode the M detected signal strings. Subsequently, at step S417, the data concatenating section 213 carries out a process inverse to the process to rearrange the M decoded signal strings to restore the original data arrangement.

Third Embodiment

The present invention can be applied not only to the magnetic recording/reproducing system conforming to the non-azimuth method, but also to a magnetic recording/reproducing system conforming to the double-azimuth method.

Figure 16:
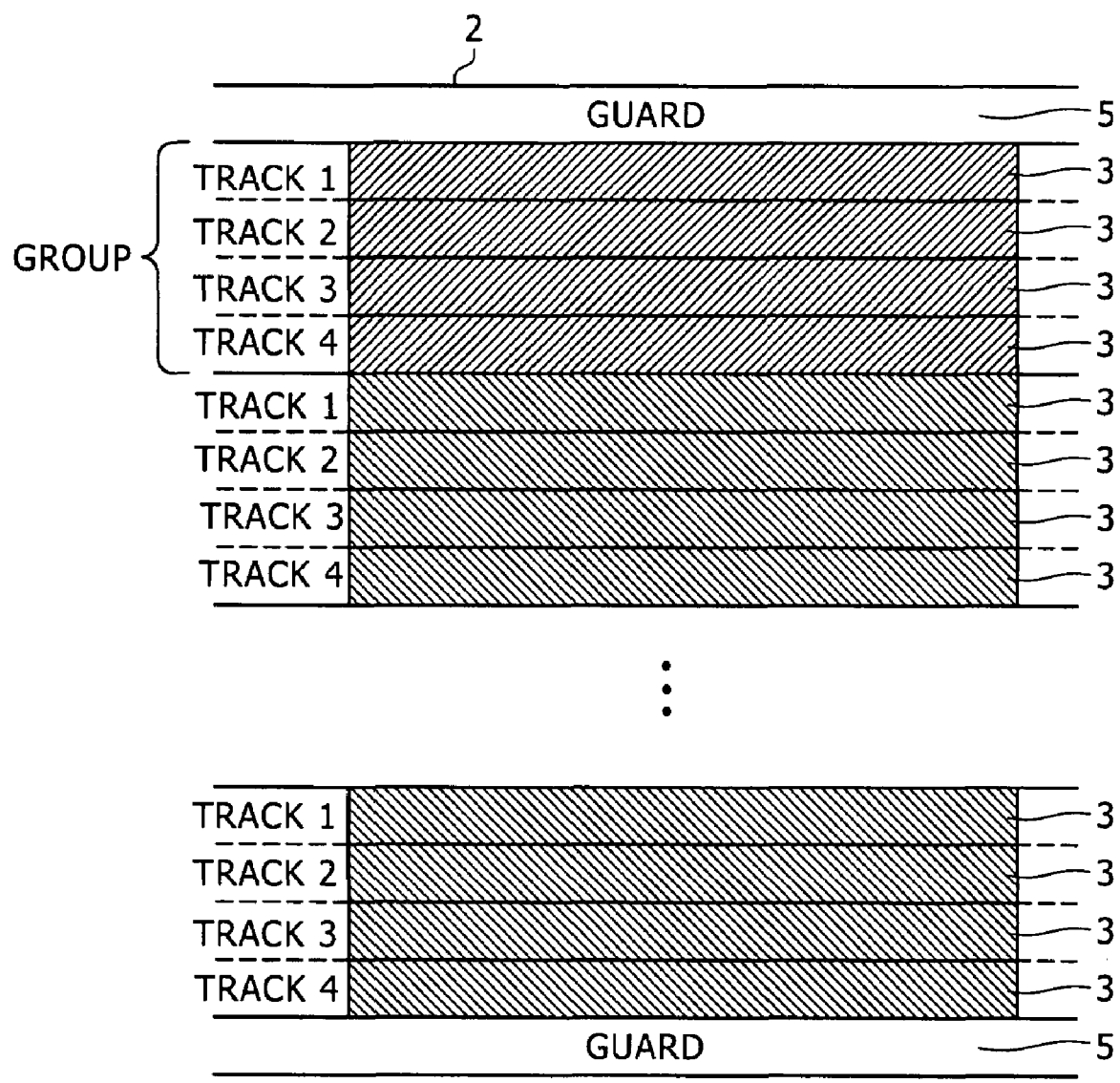
FIG. 16 is an explanatory view illustrating a method of recording data on a magnetic recording medium in conformity with the double-azimuth system.

FIG. 16 illustrates a method of recording data on the magnetic recording medium 2 in conformity with the double-azimuth method.

Also in the present method, the recording track number M is 4 (M=4) similarly as in the method described hereinabove with reference to FIG. 5. In particular, four data frames 3 are recorded on the magnetic recording medium 2 and are handled as one group in a reproduction signal process. The data frames 3 of each group are recorded such that the azimuth angle thereof is different from that of the data frames 3 of an adjacent group. By carrying out azimuth recording on the magnetic recording medium 2, it is possible to prevent interference between recording tracks belonging to adjacent groups. Thus, it is not necessary to provide a guard region described hereinabove with reference to FIG. 5 between any adjacent groups. As a result, the recording density can be further increased.

Fourth Embodiment

While a magnetic tape recording/reproduction system of a linear recording system is described above, the present invention can be applied also to a helical scanning system similarly.

Figure 17:
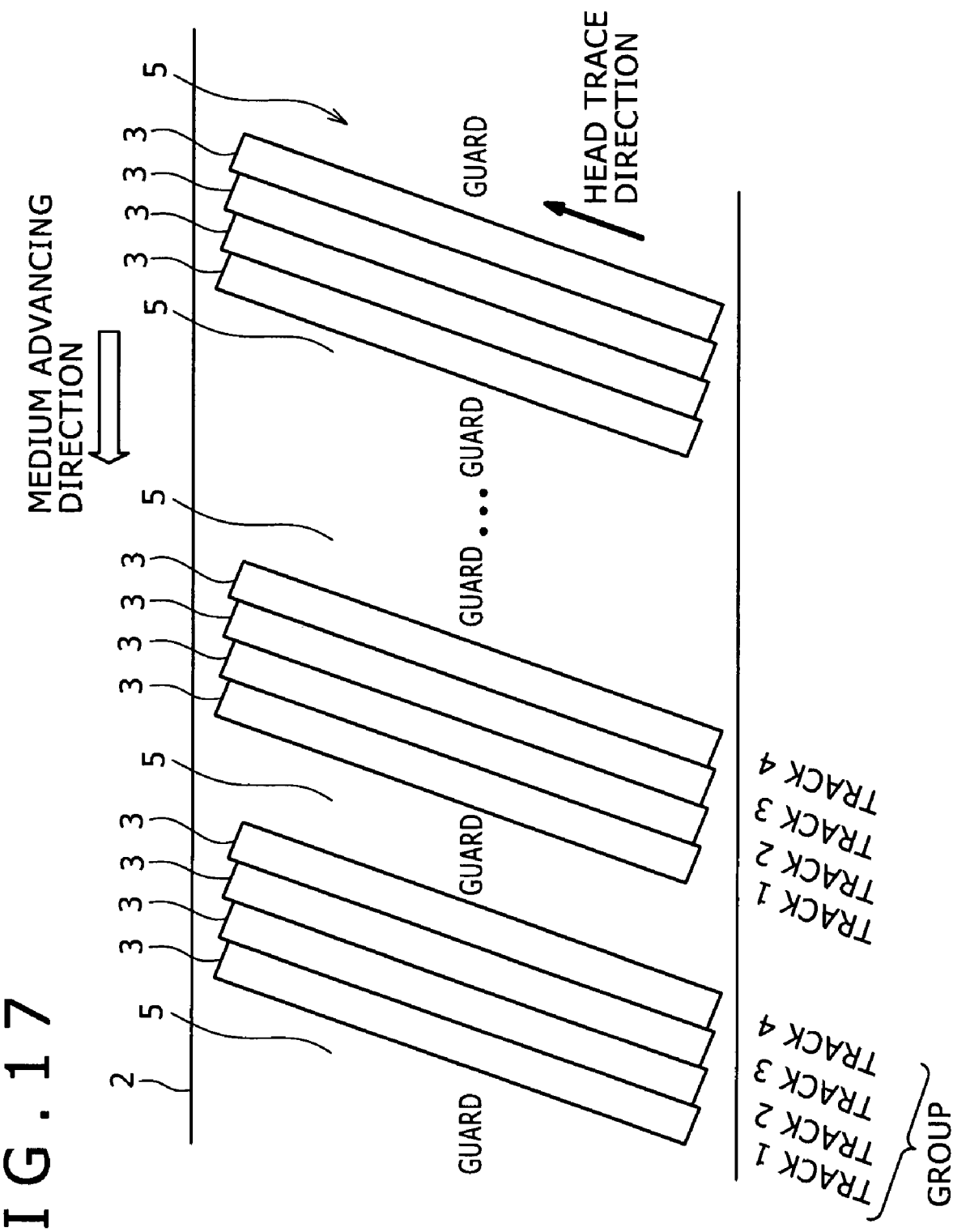
FIG. 17 is an explanatory view illustrating a method of recording data on a magnetic recording medium in conformity with the helical scan system.

FIG. 17 illustrates a method of recording on a magnetic recording medium 2 by a helical scanning system. Also in the present helical scanning system, the recording track number M is 4 (M=4) similarly as in the method described hereinabove with reference to FIG. 5. In particular, four data frames 3 are recorded on the magnetic recording medium 2 and are handled as one group in a reproduction signal process. A guard 5 is disposed between adjacent groups.

Figure 18:
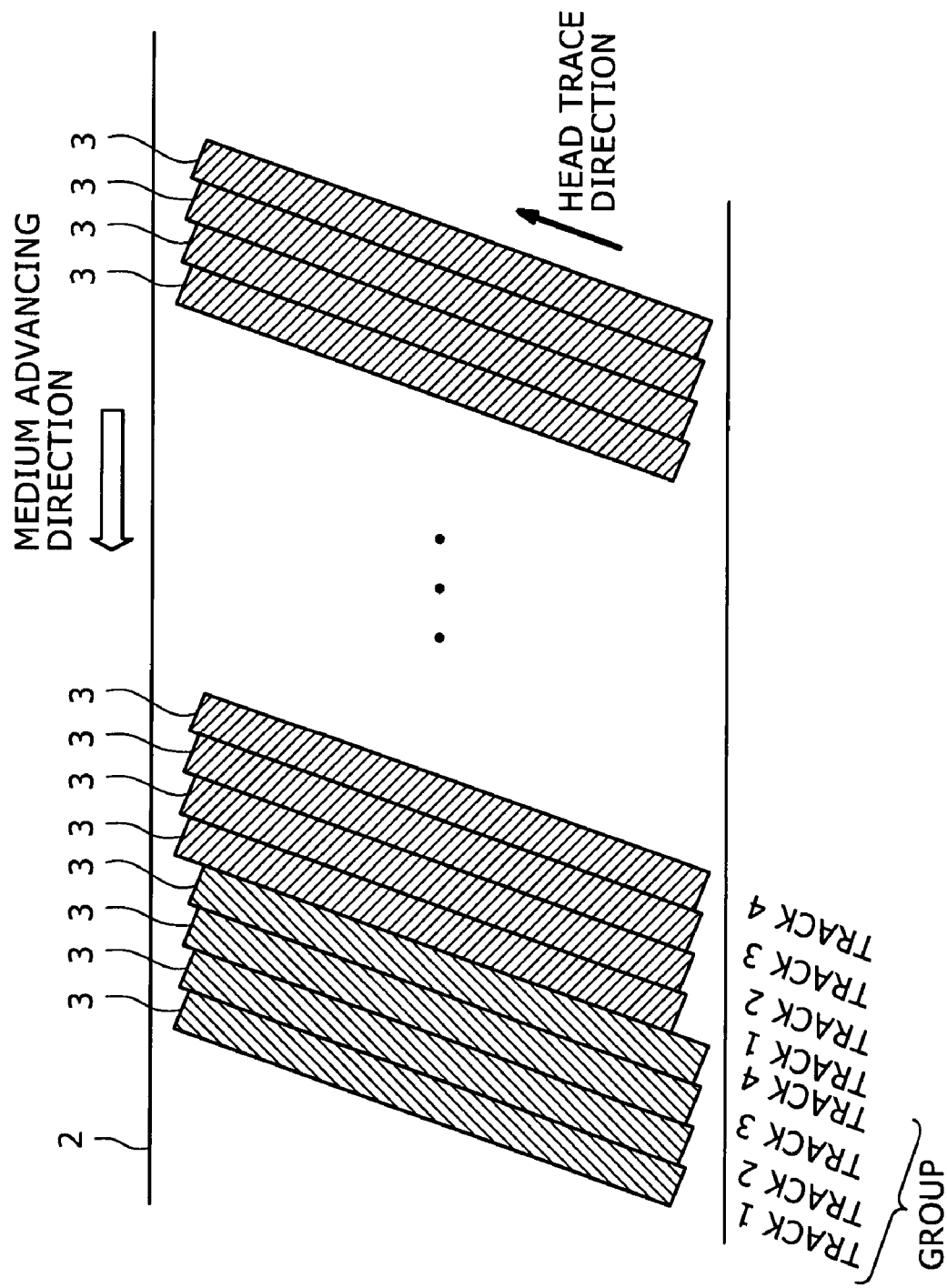
FIG. 18 is an explanatory view illustrating a method of recording data on a magnetic recording medium in conformity with the double-azimuth helical scanning method.

FIG. 18 illustrates a method of recording on a magnetic recording medium 2 by a double azimuth helical scanning system. Also in the present double azimuth helical scanning system, the recording track number M is 4 (M=4) similarly as in the method described hereinabove with reference to FIG. 5.

In particular, four data frames 3 are recorded on the magnetic recording medium 2 and are handled as one group in a reproduction signal process. The data frames 3 of each group are recorded such that the azimuth angle is different from that of the data frames 3 of an adjacent group. By carrying out azimuth recording on the magnetic recording medium 2, it is possible to prevent interference between recording tracks belonging to adjacent groups. Thus, it is not necessary to provide a guard region described hereinabove with reference to FIG. 17 between any adjacent groups. As a result, the recording density can be further increased.

Finally, it should be understood by those skilled in the art that a variety of modifications, combinations, sub-combinations and alterations may occur in dependence on design requirements and other factors insofar as they are within the scope of the appended claims or the equivalents thereof.

What is claimed is:

1. A magnetic recording/reproducing apparatus, comprising:
   a recording section configured to perform a signal process for recording a signal on a magnetic recording medium;
   a reproducing section including a reproducing head capable of reproducing a signal from a recording track of the magnetic recording medium and configured to reproduce signals from a plurality of ones of recording tracks of the magnetic recording medium by means of said reproducing head and acquire position information of said reproducing head with respect to the plural recording tracks and then generate a reproduced signal for each of the recording tracks of the magnetic recording medium on the basis of the positional information; and
   an identification signal appending section provided in said recording section and configured to append an identification signal which has a recording wavelength equal to or greater than a minimum recording wavelength and causes no interference with any adjacent one of the recording tracks to a recording signal in order to allow said reproducing section to acquire the information of said reproducing head with respect to the plural recording tracks of the magnetic recording medium.

2. The magnetic recording/reproducing apparatus according to claim 1, wherein the identification signal includes signals which are orthogonal on the time axis.

3. The magnetic recording/reproducing apparatus according to claim 2, wherein said identification signal appending section records the identification signal on each recording track in such a manner as not to overlap with the identification signal on any adjacent recording track in the moving direction of the magnetic recording medium.

4. The magnetic recording/reproducing apparatus according to claim 1, wherein the identification signal includes signals which are orthogonal on the frequency axis.

5. The magnetic recording/reproducing apparatus according to claim 1, wherein the identification signal includes an orthogonal code.

6. The magnetic recording/reproducing apparatus according to claim 1, wherein said identification signal appending section records the identification signal at a position preceding to a data region and also inside the data region.

7. The magnetic recording/reproducing apparatus according to claim 6, wherein a learning signal for automatic gain control and/or bit synchronism detection is placed at a position preceding to the identification signal.

8. The magnetic recording/reproducing apparatus according to claim 6, wherein the identification signal is placed at a position following a synchronizing signal used for detection of the start position of the identification signal.

9. The magnetic recording/reproducing apparatus according to claim 1, wherein said recording section records data in a plurality of groups each including a plurality of recording tracks on the magnetic recording medium such that a guard region in which recording of data is inhibited is disposed between adjacent ones of the groups.

10. A magnetic recording/reproducing method, comprising the steps of:
    appending, when a plurality of recording tracks are to be recorded as one group on a magnetic recording medium by means of a recording head, an identification signal which has a recording wavelength equal to or greater than a minimum recording wavelength and causes no interference of any of the recording tracks with any adjacent one of the recording tracks to a recording signal in order to allow, upon reproduction, acquisition of the position information of said reproducing head with respect to the plural recording tracks of the magnetic recording medium; and
    reproducing, by means of a reproducing head capable of reproducing signals from the plural recording tracks of the magnetic recording medium, signals from the plural recording tracks, acquiring position information of said reproducing head with respect to the plural recording tracks based on the identification signal included in the reproduced signal and then generating a reproduced signal for each of the recording tracks of the magnetic recording medium on the basis of the positional information.

11. The magnetic recording/reproducing method according to claim 10, wherein the identification signal includes signals which are orthogonal on the time axis.

12. The magnetic recording/reproducing method according to claim 11, wherein the identification signal is recorded on each recording track in such a manner as not to overlap with the identification signal on any adjacent recording track in the moving direction of the magnetic recording medium.

13. The magnetic recording/reproducing method according to claim 10, wherein the identification signal includes signals which are orthogonal on the frequency axis.

14. The magnetic recording/reproducing method according to claim 10, wherein the identification signal includes an orthogonal code.

15. The magnetic recording/reproducing method according to claim 10, wherein the identification signal is recorded at a position preceding to a data region and also inside the data region.

16. The magnetic recording/reproducing method according to claim 15, wherein a learning signal for automatic gain control and/or bit synchronism detection is placed at a position preceding to the identification signal.

17. The magnetic recording/reproducing method according to claim 15, wherein the identification signal is placed at a position following a synchronizing signal used for detection of the start position of the identification signal.

18. The magnetic recording/reproducing apparatus according to claim 10, wherein data are recorded in a plurality of groups each including a plurality of recording tracks on the magnetic recording medium such that a guard region in which recording of data is inhibited is disposed between adjacent ones of the groups.

* * * * *